US009426429B2

(12) United States Patent
Zheng et al.

(10) Patent No.: US 9,426,429 B2
(45) Date of Patent: Aug. 23, 2016

(54) SCANNING PROJECTIVE LENSLESS MICROSCOPE SYSTEM

(75) Inventors: Guoan Zheng, Pasadena, CA (US); Samuel Yang, San Dimas, CA (US); Seung Ah Lee, Pasadena, CA (US); Changhuei Yang, Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 86 days.

(21) Appl. No.: 13/281,287

(22) Filed: Oct. 25, 2011

(65) Prior Publication Data

US 2012/0098950 A1     Apr. 26, 2012

Related U.S. Application Data

(60) Provisional application No. 61/406,916, filed on Oct. 26, 2010, provisional application No. 61/482,531, filed on May 4, 2011.

(51) Int. Cl.
*H04N 7/18* (2006.01)
*G02B 21/06* (2006.01)
*G02B 21/36* (2006.01)

(52) U.S. Cl.
CPC ............... *H04N 7/183* (2013.01); *G02B 21/06* (2013.01); *G02B 21/367* (2013.01)

(58) Field of Classification Search
CPC ................................ H04N 7/18; H04N 7/183
USPC .......................................................... 348/79
See application file for complete search history.

(56) References Cited

U.S. PATENT DOCUMENTS

| 3,736,432 A | 5/1973 | Sweet |
| 5,225,057 A | 7/1993 | LeFebvre et al. |
| 5,349,191 A | 9/1994 | Rogers |
| 5,420,959 A | 5/1995 | Walker et al. |

(Continued)

FOREIGN PATENT DOCUMENTS

| CN | 101655463 A | 2/2010 |
| DE | 202 14 835 U1 | 1/2003 |

(Continued)

OTHER PUBLICATIONS

Waheb et al. Lensfree on-chip microscopy over a wide field-of-view using pixel super-resolution, May 12, 2010, opticsinfobase.org, vol. 18, No. 11, pp. 11181-11191.*

(Continued)

*Primary Examiner* — Richard Torrente
*Assistant Examiner* — Irfan Habib
(74) *Attorney, Agent, or Firm* — Sheila Martinez-Lemke; Weaver Austin Villeneuve & Sampson LLP

(57) ABSTRACT

A scanning projective lensless microscope device comprises a specimen surface, a scanning illumination source with a light element, a light detector outside the specimen surface, and a processor. The scanning illumination source scans the light element to a plurality of scanning locations to provide illumination to an object on the specimen surface. The light detector samples a sequence of sub-pixel shifted projection object images corresponding to the plurality of scanning locations. The processor constructs a high resolution image of the object based on the sequence of sub-pixel shifted projection images and a motion vector of the projections at a plane of interest.

24 Claims, 11 Drawing Sheets

(56) References Cited

U.S. PATENT DOCUMENTS

| | | | |
|---|---|---|---|
| 5,495,337 A * | 2/1996 | Goshorn | G01R 31/309 348/126 |
| 5,545,561 A | 8/1996 | Lleonart Aliberas | |
| 5,684,906 A | 11/1997 | Sugawara | |
| 5,796,112 A * | 8/1998 | Ichie | G02B 5/001 250/458.1 |
| 5,892,577 A | 4/1999 | Gordon | |
| 6,058,209 A | 5/2000 | Vaidyanathan et al. | |
| 6,147,798 A * | 11/2000 | Brooker | G02B 21/0028 359/368 |
| 6,194,718 B1 | 2/2001 | Dotan | |
| 6,215,114 B1 | 4/2001 | Yagi et al. | |
| 6,519,313 B2 | 2/2003 | Venkataramani et al. | |
| 6,555,816 B1 | 4/2003 | Sawahata et al. | |
| 6,608,717 B1 | 8/2003 | Medford et al. | |
| 6,784,417 B2 | 8/2004 | Sonoki | |
| 6,903,820 B2 | 6/2005 | Wang | |
| 6,937,323 B2 | 8/2005 | Worthington et al. | |
| 6,944,322 B2 | 9/2005 | Johnson et al. | |
| 7,142,296 B2 | 11/2006 | Cunningham et al. | |
| 7,250,598 B2 | 7/2007 | Hollingsworth et al. | |
| 7,253,947 B2 | 8/2007 | Bromage et al. | |
| 7,369,234 B2 | 5/2008 | Beaglehole | |
| 7,418,118 B2 | 8/2008 | Furnas et al. | |
| 7,705,331 B1 * | 4/2010 | Kirk | G01N 21/956 250/306 |
| 7,892,168 B2 * | 2/2011 | Sano | A61B 1/00096 600/109 |
| 7,986,824 B2 | 7/2011 | Suzuki et al. | |
| 8,139,106 B2 | 3/2012 | Maiya | |
| 8,345,351 B2 | 1/2013 | Takeuchi | |
| 8,498,681 B2 | 7/2013 | Wang et al. | |
| 8,526,006 B2 | 9/2013 | Nebosis et al. | |
| 8,730,574 B2 | 5/2014 | Araya et al. | |
| 8,837,045 B2 | 9/2014 | Popescu et al. | |
| 8,928,890 B2 | 1/2015 | Nebosis et al. | |
| 8,964,017 B2 | 2/2015 | Vertikov et al. | |
| 2002/0070350 A1 | 6/2002 | Rushbrooke et al. | |
| 2002/0080240 A1 | 6/2002 | Omi | |
| 2003/0012277 A1 | 1/2003 | Azuma et al. | |
| 2003/0032039 A1 | 2/2003 | Cunningham et al. | |
| 2004/0135079 A1 | 7/2004 | Moellmann | |
| 2004/0146965 A1 | 7/2004 | Brayton | |
| 2004/0264637 A1 * | 12/2004 | Wang | G21K 7/00 378/43 |
| 2005/0013478 A1 * | 1/2005 | Oba | G02B 21/0024 382/154 |
| 2005/0078362 A1 * | 4/2005 | Borlinghaus | G02B 21/002 359/385 |
| 2006/0007436 A1 | 1/2006 | Kurosawa et al. | |
| 2006/0077535 A1 * | 4/2006 | Luther | G02B 21/362 359/363 |
| 2006/0092503 A1 | 5/2006 | Saunders | |
| 2006/0124870 A1 * | 6/2006 | Bobanovic | G02B 21/0044 250/493.1 |
| 2006/0227328 A1 | 10/2006 | Vanwiggeren et al. | |
| 2007/0046924 A1 * | 3/2007 | Chang | G01C 7/00 356/3.01 |
| 2007/0052953 A1 | 3/2007 | Hill | |
| 2007/0058054 A1 | 3/2007 | Kagayama et al. | |
| 2007/0081200 A1 * | 4/2007 | Zomet | H04N 1/04 358/484 |
| 2007/0207061 A1 | 9/2007 | Yang et al. | |
| 2007/0229852 A1 * | 10/2007 | Wack | G01B 11/24 356/625 |
| 2007/0236782 A1 * | 10/2007 | Sano | 359/368 |
| 2008/0056610 A1 * | 3/2008 | Kanda | G02B 21/365 382/282 |
| 2008/0144029 A1 | 6/2008 | Li | |
| 2008/0158566 A1 | 7/2008 | Suzuki et al. | |
| 2008/0174862 A1 | 7/2008 | Focht | |
| 2008/0204551 A1 | 8/2008 | O'Connell et al. | |
| 2008/0213141 A1 | 9/2008 | Pinchot | |
| 2008/0214412 A1 | 9/2008 | Stahler et al. | |
| 2008/0259345 A1 * | 10/2008 | Fukutake | G02B 21/18 356/450 |
| 2009/0086314 A1 | 4/2009 | Namba et al. | |
| 2009/0091811 A1 * | 4/2009 | Asundi | G02B 21/36 359/15 |
| 2009/0122070 A1 * | 5/2009 | Aragaki | G02B 27/1046 345/589 |
| 2009/0166518 A1 | 7/2009 | Tay et al. | |
| 2009/0180179 A1 | 7/2009 | Ryu | |
| 2009/0225309 A1 | 9/2009 | Demou | |
| 2009/0225319 A1 | 9/2009 | Lee et al. | |
| 2009/0237502 A1 | 9/2009 | Maiya | |
| 2009/0268280 A1 | 10/2009 | Osawa et al. | |
| 2009/0273829 A1 * | 11/2009 | Terakawa | G01N 21/4738 359/385 |
| 2009/0276188 A1 | 11/2009 | Cui et al. | |
| 2010/0033561 A1 * | 2/2010 | Hersee | G02B 21/002 348/80 |
| 2010/0045955 A1 * | 2/2010 | Vladimirsky | G01N 21/94 355/70 |
| 2010/0108873 A1 | 5/2010 | Schwertner | |
| 2010/0308427 A1 | 12/2010 | Lenchenkov | |
| 2011/0001815 A1 | 1/2011 | Nakano et al. | |
| 2011/0063592 A1 | 3/2011 | Ezura et al. | |
| 2011/0069382 A1 * | 3/2011 | Toomre | G01N 21/648 359/388 |
| 2011/0098950 A1 | 4/2011 | Carr | |
| 2011/0102888 A1 | 5/2011 | Honda et al. | |
| 2011/0234757 A1 | 9/2011 | Zheng et al. | |
| 2011/0266181 A1 | 11/2011 | Morozov | |
| 2012/0086995 A1 * | 4/2012 | Gerchberg | G02B 27/58 359/9 |
| 2012/0098950 A1 | 4/2012 | Zheng et al. | |
| 2012/0099803 A1 | 4/2012 | Ozcan et al. | |
| 2012/0157160 A1 | 6/2012 | Ozcan et al. | |
| 2012/0218379 A1 | 8/2012 | Ozcan et al. | |
| 2012/0223214 A1 | 9/2012 | Lee et al. | |
| 2012/0223217 A1 | 9/2012 | Zheng et al. | |
| 2012/0228475 A1 | 9/2012 | Pang et al. | |
| 2012/0248292 A1 | 10/2012 | Ozcan et al. | |
| 2012/0258525 A1 | 10/2012 | Iizumi et al. | |
| 2012/0275681 A1 | 11/2012 | Honda et al. | |
| 2014/0133702 A1 | 5/2014 | Zheng et al. | |

FOREIGN PATENT DOCUMENTS

| | | |
|---|---|---|
| EP | 1 956 360 | 8/2008 |
| FR | 2 602 241 | 2/1988 |
| JP | 2010-020151 A | 1/2010 |
| JP | 2013-542468 A | 11/2013 |
| JP | 2014-515179 A | 6/2014 |
| WO | WO 91/09300 | 6/1991 |
| WO | WO 2009/113544 | 9/2009 |
| WO | WO 2011/119678 | 9/2011 |
| WO | WO 2011/139641 | 11/2011 |
| WO | WO 2012/058233 | 5/2012 |
| WO | WO 2012/094523 | 7/2012 |
| WO | WO 2012/119094 | 9/2012 |
| WO | WO 2012/119114 | 9/2012 |

OTHER PUBLICATIONS

Cui et al., Lensless high-resolution on-chip optofluidic microscopes for Caenorhabditis elegans and cell imaging, vol. 105, N0. 31, pp. 10670-10675, Aug. 5, 2008.*

U.S. Appl. No. 14/072,652, filed Nov. 15, 2013, Zheng et al.

PCT International Search Report dated Dec. 7, 2011 issued in PCT/US2011/029542.

PCT International Preliminary Report on Patentability and Written Opinion dated Oct. 4, 2012 issued in PCT/US2011/029542.

PCT International Search Report dated May 8, 2012 issued in PCT/US2011/057735.

PCT International Preliminary Report on Patentability and Written Opinion dated May 10, 2013 issued in PCT/US2011/057735.

PCT International Search Report and Written Opinion dated Sep. 25, 2012 issued in PCT/US2012/027575.

PCT International Preliminary Report on Patentability and Written Opinion dated Sep. 13, 2013 issued in PCT/US2012/027575.

(56) References Cited

OTHER PUBLICATIONS

PCT International Search Report and Written Opinion dated Sep. 21, 2012 issued in PCT/US2012/027522.
PCT International Preliminary Report on Patentability and Written Opinion dated Sep. 12, 2013 issued in PCT/US2012/027522.
Bishara et al., (2010) "Lensfree on-chip microscopy over a wide field-of-view using pixel super-resolution," *Opt. Expr.* 18:11181-11191.
Cui, Xiquan, et al., (2008) "Lensless high-resolution on-chip optofluidic microscopes for Caenorhabditis elegans and cell imaging," *Proceedings of the National Academy of Sciences of the United States of America*, 105:10670-10675.
Elad, M., and Hel-Or, Y., (Dec. 1998) "A Fast Super-Resolution Reconstruction Algorithm for Pure Translational Motion and Common Space-Invariant Blur," *IEEE Transactions on Image Processing*, 10:1187-1193, 16 pages.
Farsiu, S. et al., (Jan. 2004) "Advances and challenges in super-resolution," *Wiley Periodicals*, 14:47-57.
Farsiu, S., et al., (Oct. 2004) "Fast and robust multiframe super resolution," *IEEE Transactions on Image Processing*, 13(10):1327-1344.
Gillette, J., et al., (1995) "Aliasing reduction in staring infrared imagers utilizing subpixel techniques," *Optical Engineering*, 34:3130, 8 pages.
Hardie Russell C., et al., (Apr. 1997) "High resolution image reconstruction from a sequence of rotated and translated frames and its application to an infrared imaging system," *Optical Engineering*, 27 pp.
Heng, Xin, et al., (2006) "Characterization of light collection through a subwavelength aperture from a point source," *Optics Express*, 14:10410-10425.
Kapur, J., et al., (1985) "A New Method for Gray-Level Picture Thresholding Using the Entropy of the Histogram," *Computer vision, graphics, and image processing*, 29:273-285.
Lee, Seung Ah, et al., (Oct. 2011) "Color Capable Sub-Pixel Resolving Optofluidic Microscope and Its Application to Blood Cell Imaging for Malaria Diagnosis," *PLoS ONE* 6(10):e26127, 6 pages.
Lee, Seung, Ah, et al., (Mar. 20, 2012) "On-chip continuous monitoring of motile microorganisms on an ePetri platform," *Lab on a Chip* 12(13):2385-2390.
Liang, J. Z., et al., (Nov. 1997) "Supernormal vision and high-resolution retinal imaging through adaptive optics," *Journal of the Optical Society of America*, 14(11):2884-2892.
Lin, Z., and Shum, H.-Y., (2004) "Fundamental limits of reconstruction-based superresolution algorithms under local translation," *IEEE Transactions on Pattern Analysis and Machine Intelligence*, pp. 83-97.
Miao, Qin, et al., (2009) "Dual Modal three-dimensional Imaging of Single Cells using Optical Projection Tomography Microscope," *Journal of Biomedical Optics*, 14:3 pages.
Moon, SanJun, et al., (Jul. 15, 2009) "Integrating Microfluidics and Lensless Imaging for point-of-care testing," *Biosensors and Bioelectronics*, 24(11):3208-3214.
Park, Sung Cheol, et al., (2003) "Super-resolution image reconstruction: a technical overview," *IEEE Signal Processing Magazine*, pp. 21-36.
Pastrana, Erika (Dec. 2011) Nature Methods, 8(12):999, 1 page [doi:10.1038/nmeth.1786].
Psaltis, Demetri, et al., (Jul. 2006) "Developing optofluidic technology through the fusion of microfluidics and optics," *Nature*, 442:381-386.
Schultz, R., et al., (1998) "Subpixel Motion Estimation for Super-Resolution Image Sequence Enhancement," *Journal of Visual Communication and Image Representation*, 9(1):38-50.
Shi, J., et al., (2006) "Small-kernel superresolution methods for microscanning imaging systems," *Applied Optics*, 45:1203-1214.
Wang et al., (2009) "Characterization of acceptance angles of small circular apertures," *Optics Express* 17(26):23903-23913.
Zheng, et al., (2010) "Sub-pixel resolving optofluidic microscope for on-chip cell imaging," *Lab on a Chip*, 10:3125-3129.
Zheng, et al., (2009) "Supplementary Information for: Sub-pixel resolving optofluidic microscope for on-chip cell imaging," *Supplementary Material (ESI) for Lap on a Chip*, 10:3 pages.
Zheng, et al., (Oct. 15, 2011) "Microscopy refocusing and dark-field imaging by using a simple LED array," *Optics Letters* 36(20):3987-3989.
Zheng et al., (2011) "The ePetri dish, an on-chip cell imaging platform based on subpixel perspective sweeping microscopy (SPSM)," 6 pages and "Supporting Information" 3 pages; *Proceedings of the National Academy of Science* 108(41):16889-94.
Zheng et al., (Jul. 28, 2013) "Wide-field, high-resolution Fourier ptychographic microscopy," *Nature Photonics* | Advance Online Publication, DOI: 10.1038/NPHOTON.2013.187, 19 pages.
United States Patent and Trademark Office (USPTO) Non-Final Office Action in U.S. Appl. No. 13/069,651 dated on Mar. 28, 2014.
United States Patent and Trademark Office (USPTO) Non-Final Office Action in U.S. Appl. No. 13/411,103 dated on Mar. 11, 2014.
Chinese First Office Action dated Jan. 23, 2014 issued in CN 201180012251.6.
European Search Report dated Jun. 25, 2014 issued in EP 11 760 112.0.
European Search Report dated Jun. 25, 2014 issued in EP 11 83 6959.
European Search Report dated Jun. 25, 2014 issued in EP 12 75 2493.
Heng, Xin, et al., (Jul. 17, 2006) "Optofluidic Microscopy: A Novel High Resolution Microscope-on-a-Chip," *Leos Summer Topical Meetings*, 2006 Digest of the Quebec City, QC, Canada Jul. 17-19, 2006, Piscataway, NJ, USA, IEEE, 6(10):15-16.
Su, Ting-Wei, et al., (Apr. 23, 2010) "Multi-angle lensless digital holography for depth resolved imaging on a chip," *Optics Express*, OSA, Washington DC, US 18(9):1094-4087, 22pp.
United States Patent and Trademark Office (USPTO) Final Office Action in U.S. Appl. No. 13/069,651 dated on Nov. 25, 2014.
United States Patent and Trademark Office (USPTO) Office Action in U.S. Appl. No. 13/411,302 dated on Jan. 5, 2015.
United States Patent and Trademark Office (USPTO) Office Action in U.S. Appl. No. 14/072,652 dated on Mar. 23, 2015.
United States Patent and Trademark Office (USPTO) Final Office Action in U.S. Appl. No. 13/411,103 dated on Oct. 2, 2014.
Chinese Second Office Action dated Oct. 8, 2014 issued in CN 201180012251.6.
Chinese First Office Action [no translation] dated Jan. 20, 2015 issued in CN 201180048639.1.
Japanese Office Action [with translation] dated Oct. 28, 2014 issued in JP 2013536747.
European Office Action dated Jul. 3, 2014 issued in EP 11 836 959.4.
Chinese First Office Action dated Feb. 28, 2015 issued in CN201280003668.
European Supplementary Search Report dated Jun. 25, 2014 issued in EP 12 75 2808.
Levin-Reisman, I., et al., (2010) "Automated imaging with ScanLag reveals previously undetectable bacterial growth phenotypes," *Nat Meth*, 7(9):737-739.
Tai, Y. C., et al., (2002) "Integrated micro/nano fluidics for mass-spectrometry protein analysis," *International Journal of Nonlinear Sciences and Numerical Simulation*, 3(34):739-741.
Wu, J., et al., (Jul. 1, 2010) "Wide field-of-view microscope based on holographic focus grid illumination," *Optics Letters*, 35(13):2188-2190.
Yanowitz, et al., (2005) "Cyclin D involvement demarcates a late transition in *C. elegans* embryogenesis," *Developmental Biology*, 279:244-251.
United States Patent and Trademark Office (USPTO) Non-Final Office Action in U.S. Appl. No. 13/069,651 dated on Jul. 15, 2015.
United States Patent and Trademark Office (USPTO) Final Office Action in U.S. Appl. No. 13/411,302 dated on Sep. 25, 2015.
United States Patent and Trademark Office (USPTO) Final Office Action in U.S. Appl. No. 14/072,652 dated on Nov. 6, 2015.
United States Patent and Trademark Office (USPTO) Office Action in U.S. Appl. No. 13/411,103 dated on Jun. 17, 2015.

(56) References Cited

OTHER PUBLICATIONS

United States Patent and Trademark Office (USPTO) Notice of Allowance in U.S. Appl. No. 13/411,103 dated on Jan. 4, 2016.
Chinese Third Office Action dated Apr. 27, 2015 issued in CN 201180012251.6.
European Examination Report dated Jun. 5, 2015 issued in EP 11 760 112.0.
European Office Action dated Jun. 5, 2015 issued in EP 11 836 959.4.
Japanese Office Action [with translation] dated Jun. 23, 2015 issued in JP 2013-536747.
European Examination Report dated Jun. 5, 2015 issued in EP 12 75 2493.
Japanese Office Action dated Oct. 6, 2015 issued in JP 2013-556657.
"Fresnel number," Wikipedia, last modified May 2, 2010, 2pp.
Confocal Raman Microscopy (Oct. 2006) "Optofluidic Microscope Enables Lensless Imaging of Microorganisms," *Biophotonics International*, 13(10):24.
"Zone plate," Wikipedia, last modified Apr. 2, 2009.
Aigouy, L., et al., (2007) "Near-Field Analysis of Surface Waves Launched at Nanoslit Apertures," *Physical Review Letters*, 98:153902.
Biener, G., et al., (2011) "Combined reflection and transmission microscope for telemedicine applications infield settings, "*Lab Chip*, 11(16):2738-2743.
Blanco et al. (2006) "Microfluidic-optical integrated CMOS compatible devices for label-free biochemical sensing," *J. Micromech. Microeng.* 16:1006-1016.
Borenfreund, E. & Puerner, J. A., (1985) "Toxicity determined in vitro by morphological alterations and neutral red absorption," *Toxicology Letters* 24:119-124.
Breslauer, D., et al., (Jul. 2009) "Mobile Phone Based Clinical Microscopy for Global Health Applications" *PLoS ONE*, 4(7):e6320, 7pp.
Cavanaugh, P.F. et al., (1990) "A semi-automated neutral red based chemosensitivity assay for drug screening," *Investigational new drugs* 8:347-354.
Cohen, A.R., Gomes, F. L.A.F., Roysam, B.& Cayouette, M., (Mar. 2010) "Computational prediction of neural progenitor cell fates," *Nature Methods*, 7(3):213, 10pp.
Costa, M. R. et al., (2011) "Continuous live imaging of adult neural stem cell division and lineage progression in vitro," *Development* 138(6):1057-1068.
Crane, M., Chung, K., Stirman, J. & Lu, H., (2010) "Microfluidics-enabled phenotyping, imaging, and screening of multicellular organisms," *Lab on a Chip* 10:1509-1517.
Denis, L., Lorenz, D., Thiébaut, E., Fournier, C., Trede, D., (2009) "Inline hologram reconstruction with sparsity constraints," *Opt Lett*, 34:3475-3477.
Dykstra, B. et al., (May 23, 2006) "High-resolution video monitoring of hematopoietic stem cells cultured in single-cell arrays identifies new features of self-renewal," *PNAS*, 103(21):8185-8190.
Eilken, H.M., Nishikawa, S.I. & Schroeder, T. (Feb. 2009) "Continuous single-cell imaging of blood generation from haemogenic endothelium," *Nature* 457:896-900.
Farsiu S. et al., (Jan. 2006) "Multiframe Demosaicing and Super-Resolution of Color Images," *IEEE Transactions on Image Processing*, 15(1):141-159.
Farsiu, S., Robinson, D., Elad, M. & Milanfar, P., (2004) "Advances and Challenges in Super Resolution," *International Journal of Imaging Systems and Technology* 14:47-57.
Fienup, J.R., (Jul. 1978) "Reconstruction of an object from the modulus of its Fourier transform," *Opt Lett*, 3(1):27-29.
Garcia-Sucerquia, J., et al., (Feb. 2006) "Digital in-line holographic microscopy," *Appl. Opt.*, 45(5): 836-850.

Hardie, R., Barnard, K., and Armsrong, E.E., (Dec. 1997) "Joint MAP Registration and High-Resolution Image Estimation Using a Sequence of Undersampled Images," *IEEE Transactions on Image Processing* 6(12):1621-1633.
Heng, Xin, et al., (2006) "Optofluidic Microscopy—a method for implementing a high resolution optical microscope on a chip," *Lab Chip*, 6(10):1274-1276.
Hou, H., et al., (2010) "Deformability based cell margination—A simple microfluidic design for malaria infected erythrocyte separation," *Lab on a Chip* 10:2605-2613.
Isikman, S.O., et al., (May 3, 2011) "Lens-free optical tomographic microscope with a large imaging volume on a chip," *PNAS USA*, 108(18):7296-7301.
Koren, G., Polack, F., Joyeux, D., (Mar. 1993) Iterative algorithms for twin-image elimination in in-line holography using finite-support constraints, *J Opt Soc Am A* 10:423-433.
Lai, S., King, B., Neifeld, M.A., (2000) "Wave front reconstruction by means of phase-shifting digital in-line holography," *Opt Commun.*, 173:155-160.
Lange et al., (2005) "A microfluidic shadow imaging system for the study of the nematode *Caenorhabditis elegans* in space," *Sensors and Actuators B*, 107:904-914.
Li, W., Knoll, T., Thielecke, H., (2010) "On-chip integrated lensless microscopy module for optical monitoring of adherent growing mammalian cells," *Engineering in Medicine and Biology Society (EMBC), 2010 32nd Annual International Conference of the IEEE*, pp. 1012-1015.
Liu, G. and Scott, P., (Jan. 1987) "Phase retrieval and twin-image elimination for in-line Fresnel holograms," *J Opt Soc Am A*, 4(1):159-165.
Malek M., Aliano, D., Coetmellec, S., Lebrun, D., (May 17, 2004) "Digital in-line holography: Influence of the shadow density on particle field extraction," *Opt. Express*, 12(10):2270-2279.
Medoro, G. et al. (2003) "A Lab-on-a-Chip for Cell Detection and Illumination," *IEEE Sensors Journal*, 3(3):317-325.
Miao, Q., Rahn, J.R., Tourovskaia, A., Meyer, M.G., Neumann, T., Nelson, A.C., and Seibel, E.J., (Dec. 21, 2009) "Dual-modal three dimensional imaging of single cells with isometric high resolution using an optical projection tomography microscope," *J. Biomed. Opt.* 14(6):064034, 6pp.
Micó, V., Garcia, J., Zalevsky, Z., and Javidi, B., (Oct. 2010) "Phase-Shifting Gabor Holographic Microscopy," *J Disp Technol*, 6(10):484-489.
Milanfar, P., (2010) "Super-Resolution Imaging," *CRC Press*, 9pp.
Mudanyali, O., et al., (Jun. 7, 2010) "Compact, light-weight and cost-effective Microscope based on Lensless Incoherent Holography for Telemedicine Applications," *Lab on a Chip*, 10:1417-1428, 25 pp.
Repetto, G., Del Peso, A. & Zurita, J.L., (2008) "Neutral red uptake assay for the estimation of cell viability/cytotoxicity," *Nature Protocols* 3(7):1125-1131.
Rodenburg, J.M., Hurst, A.C., Cullis, A.G., (2007) "Transmission microscopy without lenses for objects of unlimited size, " *Ultramicroscopy*, 107:227-231.
Schroeder, T., (2011) "Long-term single-cell imaging of mammalian stem cells," *Nature Methods Supplement* 8(4):S30-S35.
Schultz, R.R., Meng, L., Stevenson, R.L., (1998) "Subpixel motion estimation for superresolution image sequence enhancement," *Journal of Visual Communication and Image Representation*, 9(1):38-50.
Seo, et al., (2009) "Lensfree holographic imaging for on-chip cytometry and diagnostics," *Lab on a Chip*, 9(6):777-787.
Xu, et al. (2001) "Digital in-line holography for biological applications," *PNAS USA*, 98:11301-11305.
Xu, L., Mlao, J., Asundi, A., (Dec. 2000) "Properties of digital holography based on in-line configuration," *Opt Eng*, 39(12):3214-3219.
Zhang, F., Pedrini, G., and Osten, W., (2007) "Phase retrieval of arbitrary complex-valued fields through apertureplane modulation," *Phys Rev A*, 75:043805, 4pp.

\* cited by examiner (a) Scanning frame number: 1

(b) Reconstructed image from 225 frames

SCANNING PROJECTIVE LENSLESS MICROSCOPE SYSTEM

CROSS-REFERENCES TO RELATED APPLICATIONS

This is a non-provisional application of, and claims priority to, U.S. Provisional Patent Application No. 61/406,916 entitled "Scanning Projective Microscopy System for 2D and 3D Imaging" filed on Oct. 26, 2010 and U.S. Provisional Patent Application No. 61/482,531 entitled "ePetri: An On-Chip Cell Imaging Platform based on Sub-Pixel Perspective Sweeping Microscopy" filed on May 4, 2011. Those provisional applications are hereby incorporated by reference in their entirety for all purposes.

This non-provisional application is related to the following co-pending and commonly-assigned patent application, which is hereby incorporated by reference in its entirety for all purposes:

- U.S. patent application Ser. No. 12/398,050 entitled "Optofluidic Microscope Device with Photosensor Array" filed on Mar. 4, 2009.
- U.S. patent application Ser. No. 13/069,651 entitled "Super Resolution Optofluidic Microscopes for 2D and 3D Imaging" filed on Mar. 23, 2011.

STATEMENT AS TO RIGHTS TO INVENTIONS MADE UNDER FEDERALLY SPONSORED RESEARCH OR DEVELOPMENT

This invention was made with government support under Grant No. AI096226 awarded by the National Institutes of Health. The government has certain rights in the invention.

BACKGROUND OF THE INVENTION

Embodiments of the present invention generally relate to high resolution (HR) (e.g., sub-pixel resolution) microscope devices and other HR imaging devices. More specifically, certain embodiments relate to scanning projective lensless microscopy (SPLM) devices, SPLM systems and SPLM methods for two-dimensional (2D) monochromatic HR imaging, 2D HR color imaging, three-dimensional (3D) monochromatic HR imaging, and/or 3D color HR imaging.

The miniaturization of biomedical imaging tools has the potential to vastly change methods of medical diagnoses and scientific research. More specifically, compact, low-cost microscopes could significantly extend affordable healthcare diagnostics and provide a means for examining and automatically characterizing a large number of cells, as discussed in Psaltis, D., et al., "*Developing optofluidic technology through the fusion of microfluidics and optics*," Nature, Vol. 442, pp. 381-386 (2006), which is hereby incorporated by reference in its entirety for all purposes. Conventional optical microscopes have bulky optics, and have proven to be expensive and difficult to miniaturize.

Rapid advances and commercialization efforts in complementary metal oxide semiconductor (CMOS) imaging sensor technology has led to broad availability of cheap and high pixel density imaging sensor chips. In the past few years, these imaging sensor chips enabled the development of new microscopy implementations that are significantly more compact and less expensive than conventional microscopy designs with bulky optics. The optofluidic microscope and the digital in-line holographic microscope are two examples of these new developments. Some examples of optofluidic microscope technologies can be found in Heng, X., et al., "*Optofluidic microscopy—method for implementing a high resolution optical microscope on a chip*," Lab Chip, Vol. 6, pp. 1274-1276, Cui, Xiquan, et al., "*Lensless high-resolution on-chip optofluidic microscopes for Caenorhabditis elegans and cell imaging*," Proceedings of the National Academy of Science, Vol. 105, p. 10670 (2008), and Zheng, G., Lee, S A., Yang, S., Yang, C., "*Sub-pixel resolving optofluidic microscope for on-chip cell imaging. Lab Chip*," Lab Chip, Vol. 10, pp. 3125-3129 (2010) ("Zheng"), which are hereby incorporated by reference in their entirety for all purposes. Some examples of digital in-line holographic microscopy can be found in Repetto, L., Piano, E., Pontiggia, C., "Lensless digital holographic microscope with light-emitting diode illumination," Opt. Lett., Vol. 29, pp. 1132-1134 (2004), ("Repetto"), Mudanyali, O., et al., "*Compact, light-weight and cost-effective microscope based on lensless incoherent holography for telemedicine applications*," Lab Chip, Vol. 10, pp. 1417-1428 (2010) ("Mudanyali"), Xu, W., Jericho, M., Meinertzhagen, I., Kreuzer, H., "*Digital in-line holography for biological applications*," Proc Natl Acad Sci USA, Vol. 98, pp. 11301-11305 (2001) ("Xu"), Garcia-Sucerquia, J., et al., "*Digital in-line holographic microscopy*," Appl. Opt., Vol. 45, pp. 836-850 (2006) ("Garcia-Sucerquia"), Malek M., Allano, D., Coëtmellec, S., Lebrun, D., "*Digital in-line holography: Influence of the shadow density on particle field extraction*," Opt. Express, Vol. 12, pp. 2270-2279 (2004) ("Malek"), Isikman, S.O., et al., "*Lens-free optical tomographic microscope with a large imaging volume on a chip*," Proc Natl Acad Sci USA, Vol. 108, pp. 7296-7301 (2011), which are hereby incorporated by reference in their entirety for all purposes.

Both optofluidic and in-line holographic microscopy technologies are designed to operate without lenses and, therefore, circumvent their optical limitations, such as aberrations and chromaticity. Both technologies are suitable for imaging dispersible samples, such as blood, fluid cell cultures, and other suspensions of cells or organisms. However, neither can work well with confluent cell cultures or any sample in which cells are contiguously connected over a sizable length scale.

In the case of an optofluidic microscope device, imaging requires fluidic (e.g., microfluidic) flow of specimens across a scanning area. Adherent, confluent, or contiguously arranged specimens are usually incompatible with imaging in a fluidic mode. In addition, the field of view may be limited by the geometry of the fluid channel.

In digital in-line holographic microscopy, the interference intensity distribution of a target under controlled light illumination is measured and then an image reconstruction algorithm is applied to render microscopy images of the target. Two examples of algorithms can be found in Liu, G., Scott, P., "*Phase retrieval and twin-image elimination for in-line Fresnel holograms*," J Opt Soc Am A, Vol. 4, pp. 159-165 (1987) ("Liu"), Fienup, JR., "*Reconstruction of an object from the modulus of its Fourier transform*," Opt Lett, Vol. 3, pp. 27-29 (1978) ("Fienup"), Koren, G., Polack, F., Joyeux, D., "*Iterative algorithms for twin-image elimination in in-line holography using finite-support constraints*," J Opt Soc Am A, Vol. 10, pp. 423-433 (1993), which are hereby incorporated by reference in their entirety for all purposes. The image quality depends critically on the extent of the target, the scattering property and the signal-to-noise ratio (SNR) of the measurement processes, which are described in Mudanyali, and Garcia-Sucerquia, Malek, Fienup, and also in Lai, S., King, B., Neifeld, M A, "*Wave front reconstruction by means of phase-shifting digital in-line holography*,"

Opt Commun., Vol. 173, pp. 155-160 (2000) ("Lai"), and Rodenburg, J., Hurst, A., Cullis, A., "*Transmission microscopy without lenses for objects of unlimited size*," Ultramicroscopy, Vol. 107, pp. 227-231 (2007) ("Rodenburg"), which are hereby incorporated by reference in their entirety for all purposes. The method works well for well-isolated targets, such as diluted blood smear slides. However, such approaches appear to have not been applied to targets that occupy more than 0.1 mm2 in total contiguous area coverage with submicron resolution, as found in Repetto, Madanyali, Xu, Garcia-Sucerquia, and also in Biener, G., et al., "*Combined reflection and transmission microscope for telemedicine applications in field settings*," Lab Chip, Vol. 11, pp. 2738-2743 (2011), which is hereby incorporated by reference in its entirety for all purposes.

The reason for this limitation is well-known: the loss of phase information during the intensity recording process. In order to recover the phase information, object support has to be used in the iterative phase recovery algorithm, which involves the light field propagation back and forth between the imaging domain (where the intensity data are applied) and object domain (where a priori object constrains are applied), as discussed in Liu. When the test object is real or nonnegative, it is easy to apply the powerful normegativity support constraint to extract the phase information from the recorded diffraction intensity, as discussed in Liu. However, for digital in-line holography, light field in the object domain is complex valued and, therefore, the phase recovery is possible only if the support of the object is sufficiently isolated (i.e., sparsity constrains) or the edges are sharply defined (true boundary), as discussed in Rodenburg and Fienup and also in Denis, L., Lorenz, D., Thiébaut, E., Fournier, C., Trede, D., "*Inline hologram reconstruction with sparsity constraints*," Opt Lett, Vol. 34, pp. 3475-3477 (2009), Zhang, F., Pedrini, G., Osten, W., "*Phase retrieval of arbitrary complex-valued fields through aperture-plane modulation*," Phys Rev A, Vol. 75, p. 043805 (2007), which are hereby incorporated by reference in their entirety for all purposes. Furthermore, the interference nature of the technique implies that coherence-based noise sources, such as speckles and cross-interference, would be present and would need to be addressed, as discussed in Garcia-Sucerquia and Malek, and also in Xu, L., Miao, J., Asundi, A., "*Properties of digital holography based on in-line configuration,*" Opt Eng, Vol. 39, pp. 3214-3219 (2000), which is hereby incorporated by reference in its entirety for all purposes. Methods for mitigating problems in digital in-line holographic microscopy have been reported in Lai, Rodenburg and Mico, V., Garcia, J., Zalevsky, Z., Javidi, B., "*Phase-Shifting Gabor Holographic Microscopy,*" J Disp Technol, Vol. 6, pp. 484-489 (2010), which is hereby incorporated by reference in its entirety for all purposes. The generated images based on these mitigating methods have artifacts that may arise from interference, and are identifiably different and of lower quality than images acquired with conventional microscopes due to coherence based noise sources.

BRIEF SUMMARY OF THE INVENTION

Embodiments of the present invention relate to SPLM devices, SPLM systems, and methods for generating HR (e.g., sub-pixel resolution) monochromatic 2D images, HR monochromatic 3D images, HR color 2D images, and/or HR color 3D images. An SPLM device includes a specimen surface for an object being imaged, a scanning illumination source, a light detector (e.g., CMOS imaging sensor) having a sensing surface, and a processor. The scanning illumination source sweeps a light element (e.g., set of pixels) to different locations above the object to provide illumination from different angles. The illumination generates sub-pixel shifted projections of the object on the sensing surface of the light detector. The light detector records one or more sequences of sub-pixel shifted low resolution (LR) projection images of the object. The processor can use a super-resolution algorithm to construct an HR image of the object based on a sequence of sub-pixel shifted LR projection images.

One embodiment is directed to a SPLM device comprising a specimen surface, a scanning illumination source comprising a light element, a light detector outside the specimen surface, and a processor. The scanning illumination source scans the light element to a plurality of scanning locations to provide illumination from different illumination angles to a specimen on the specimen surface. The light detector samples a sequence of sub-pixel shifted projection images of the specimen. The sequence of sub-pixel shifted projection images correspond to the plurality of scanning locations. The processor can construct a high resolution image of the specimen based on the sequence of sub-pixel shifted projection images and a motion vector of the projections.

Another embodiment is directed to an SPLM system comprising an SPLM device and a processor. The SPLM device comprises a specimen surface, a scanning illumination source comprising a light element, a light detector outside the specimen surface, and a processor. The scanning illumination source scans the light element to a plurality of scanning locations to provide illumination from different illumination angles to a specimen on the specimen surface. The light detector samples a sequence of sub-pixel shifted projection images of the specimen. The sequence of sub-pixel shifted projection images correspond to the plurality of scanning locations. The processor can construct a high resolution image of the specimen based on the sequence of sub-pixel shifted projection images and a motion vector of the projections.

Another embodiment is directed to a method of generating a high resolution image of an object using a SPLM device having a specimen surface, an illuminating display, a light detector outside the specimen surface, and a processor. The method receives the object on the specimen surface. The method also sequentially illuminates one or more pixels of the illuminating display at a plurality of scanning locations to provide illumination from different illumination angles to the object. The method also captures a sequence of sub-pixel shifted projection images associated with the plurality of scanning locations. The method also determines a motion vector of the sub-pixel shifted projection images at a plane and constructs a high resolution image of the object based on the sequence of sub-pixel shifted projection images and the motion vector.

These and other embodiments of the invention are described in further detail below.

BRIEF DESCRIPTION OF THE DRAWINGS

FIG. 7(a) is a large field of view color HR image of a confluent HeLa cell specimen constructed by an SPLM system, according to embodiments of the invention.

FIG. 7(c1) is an LR projection image from a small region of FIG. 7(b1), captured by the light detector of an SPLM system, according to embodiments of the invention.

FIG. 7(b2) is a reconstructed HR image from the same small region of FIG. 7(a) constructed by an SPLM system, according to embodiments of the invention.

FIG. 7(c2) is a reconstructed HR image from a small region of FIG. 7(b2) constructed by an SPLM system, according to embodiments of the invention.

FIG. 7(d) is a conventional microscopy image of similar cells using a microscope with 40×, NA=0.66 objective lens.

DETAILED DESCRIPTION OF THE INVENTION

Embodiments of the present invention will be described below with reference to the accompanying drawings. Some embodiments include an SPLM device having a specimen surface with an object being imaged, a scanning illumination source (e.g. a smartphone), a light detector (e.g., CMOS imaging sensor) having a sensing surface, a thin transparent layer between the sensing surface and the specimen surface, and a processor. During a scanning cycle, the scanning illumination source scans (sweeps) or otherwise translates a light element (e.g., one or more pixels of an LCD) to different scanning locations to illuminate the object from different illumination angles. For example, different sets of pixels on an LCD may be sequentially illuminated. The illumination from the light element generates sub-pixel shifted projections of the object on the sensing surface of the light detector. The light detector records a sequence of sub-pixel shifted LR projection images associated with the locations of the light element at different times during the scanning cycle. Using a suitable super-resolution (SR) algorithm, the processor can construct an HR image of the object based on the sequence of sub-pixel shifted LR projection images and a motion vector of the projections. Under different imaging schemes, the SPLM device can generate HR monochromatic 2D images, HR monochromatic 3D images, HR color 2D images, and/or HR color 3D images. In a digital focusing scheme, the SPLM device can focus an HR image of the object at a plane through the object by using a motion vector at that plane to construct the HR image.

Embodiments of the invention provide one or more technical advantages. In an SPLM system of embodiments, the scanning illumination source is located at a larger distance from the sensing surface as compared to the distance between the object and the sensing surface. Thus, small translations of the light element correspond to larger translations of the projections on the sensing surface. With this geometry, the scanning illumination source can easily and accurately control and maintain sub-pixel shifts of the projections. This can provide an advantage over other systems, such as prior microscanning systems, that used actuators and controller to control sub-pixel movements of the object or a platform holding the object. Another advantage of embodiments is that this method may provide an autonomous, cost effective, high quality microscopic solution for high resolution imaging of confluent samples and other samples in which objects (e.g., cells) are contiguously connected over a sizable length.

I. Scanning Projective Lensless Microscope (SPLM) System

Figure 1:
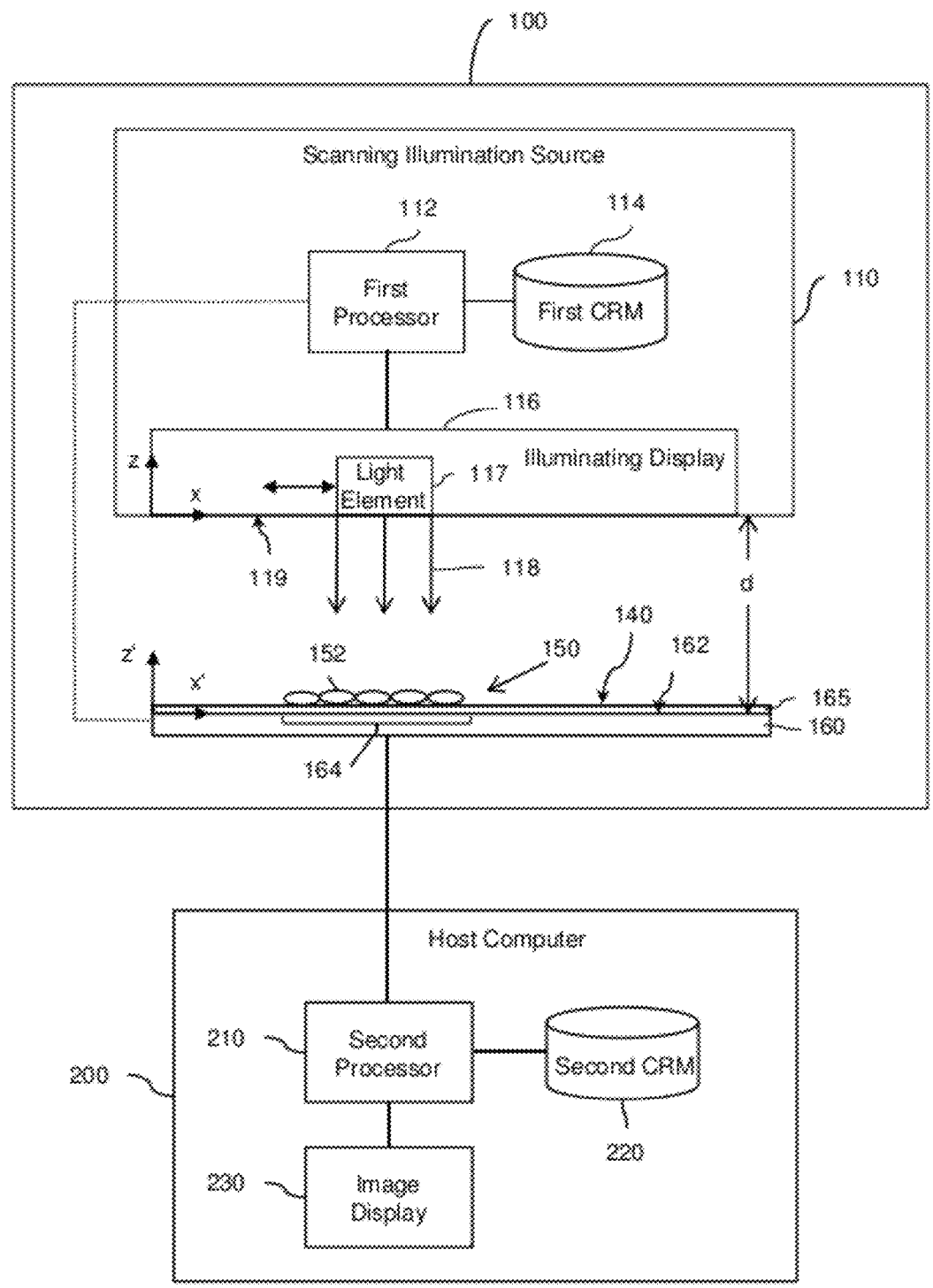
FIG. 1 is a schematic diagram of components and partial components of a SROFM, according to embodiments of the invention.

FIG. 1 is a schematic diagram of components and partial components of an SPLM system 10, according to embodiments of the invention. The SPLM system 10 includes an SPLM device 100 and a host computer 200.

The SPLM device 100 includes a specimen surface 140 for receiving a specimen (e.g., confluent sample). The SPLM system 10 can image at least a portion of the specimen 150. In the illustrated example, a specimen 150 with five objects 152 (e.g., cells) is located on the specimen surface 140. Although five objects 152 are shown, the specimen 150 may have any suitable number (e.g., 1, 2, 10, 100, 1000, etc.) or portion(s) of objects 152.

The SPLM device 100 also includes a scanning illumination source 110 having a first processor 112, a first computer readable medium (CRM) 114, and an illuminating display 116 (e.g., an LCD, a light emitting diode (LED) display, etc.). The first processor 112 is in electronic communication with the illuminating display 116 and with the first CRM 114. The illuminating display 116 includes a light element 117 (e.g., one or more pixels of an LCD or LED display)) capable of generating illumination 118 (e.g., incoherent light). The illuminating display 116 also includes a display surface 119. The light element 117 is located at the display surface 119 in the illustrated example. In other embodiments, a transparent layer may be located between the display surface 119 and the light element 117. Also, a transparent layer may be located outside the display surface 119 in some embodiments. The scanning illumination source 110 also includes an x-axis, a y-axis (not shown), and a z-axis. The x-axis and y-axis lie in a plane at the display surface 119. The z-axis is orthogonal to this plane.

Figure 3:
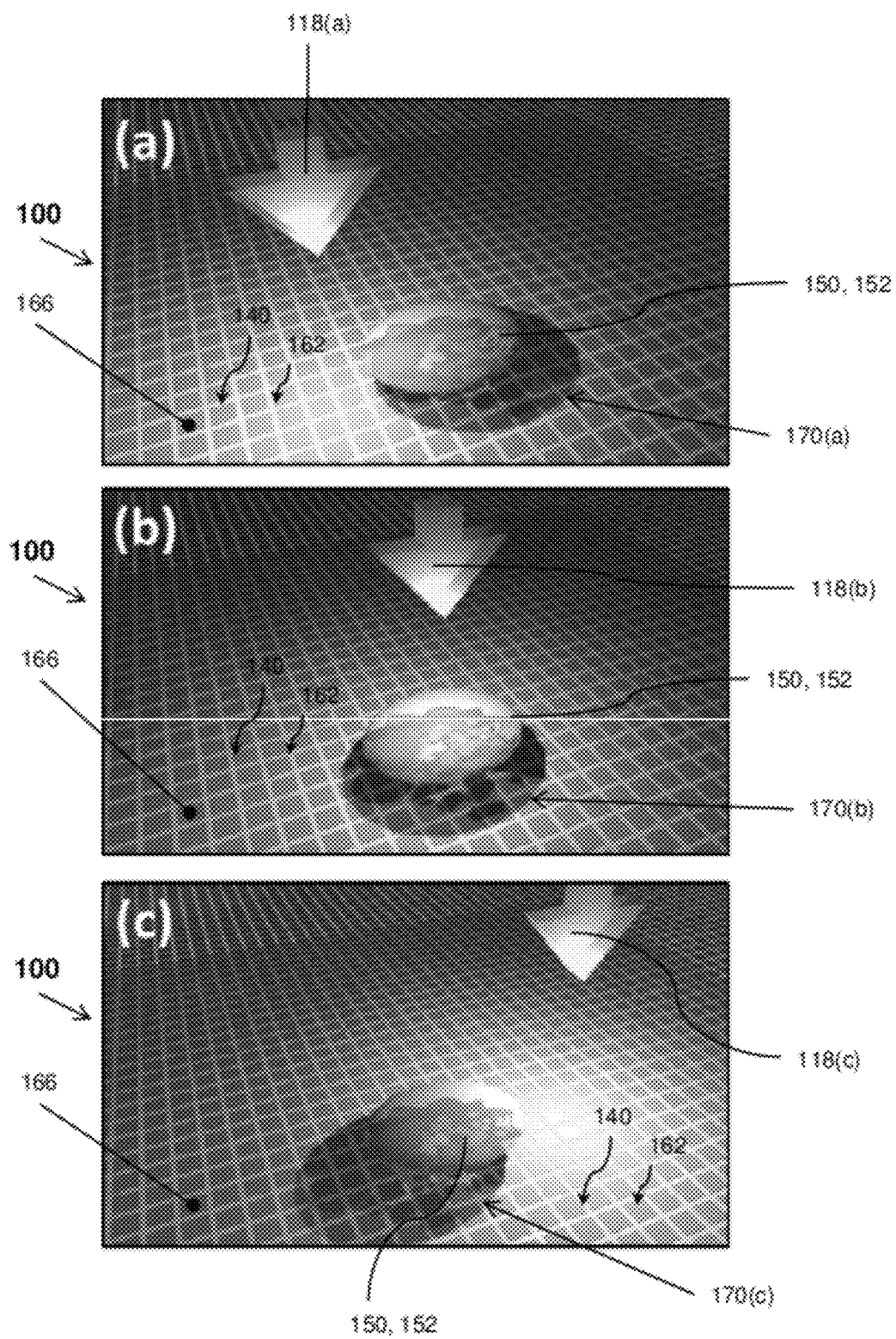
FIGS. 3(a), 3(b), and 3(c) are drawings of perspective views of components and partial components of an SPLM device during a scanning cycle of an imaging run, according to embodiments of the invention.

The scanning illumination source 110 can scan (sweep) or otherwise translate the light element 117 to different scanning locations across the display surface 119 in order to provide illumination 118 to the specimen 150 from different illumination angles. The shifting light element 117 (source) of the illumination 118 generates shifting projections 170 (as shown in FIG. 3) of a specimen 150 on the sensing surface 162. In FIG. 1, the light element 117 is shown at a scanning position at a time, t during the scanning cycle of an imaging run. Each scanning cycle can refer to a time interval during which the scanning illumination source 110 scans or otherwise translates the light element 117 to the scanning locations in that particular scanning cycle. An imaging run can refer a time interval during which one or more operations of the SPLM system 10 generates an HR image based on light data collected during one or more scanning cycles. In embodiments, the light element 117 may shift during a scanning cycle to n×m scanning locations in a two-dimensional (n×m) array of scanning locations: $(x_{i=1 \text{ to } n}, y_{j=1 \text{ to } m})$ on the display surface 119.

The SPLM device 100 also includes a light detector 160 for capturing projection images. The light detector 160 includes a sensing surface 162 having a sensing area 164. The sensing surface 162 is located at a distance, d, from the display surface 119. The light detector 160 also includes a transparent layer 165 (e.g., thin transparent passivation layer) located between the specimen surface 140 and the sensing surface 162. During a scanning cycle, the illumination 118 from the light element 117 generates projections 170 (shown in FIG. 3) of the specimen 150 on the sensing surface 162. The light detector 160 can sample (capture) one or more sequences of sub-pixel shifted LR projection images of the specimen 150 during a scanning cycle. Each sub-pixel shifted LR projection image can refer to an LR projection image that has shifted a sub-pixel distance from a neighboring LR projection image in the sequence. Neighboring LR projection images in a sequence can refer to two LR projection images that are proximal in distance. In some cases, neighboring LR projection images may also be projection images that have been sequentially captured in time during a scanning cycle.

As shown by a dotted line, the light detector 160 may optionally be in electronic communication with the first processor 112 for synchronization of sampling by the light detector 160 with scanning by the scanning illumination source 110. The light detector 160 also includes an x'-axis, a y'-axis (not shown), a z'-axis. The x'-axis and y'-axis lie in a plane at the sensing surface 162 of the light detector 160. The z'-axis is orthogonal to this plane.

The SPLM system 10 also includes a host computer 200 having a second processor 210, a second CRM 220 in electronic communication with the second processor 210, and an image display 230 in electronic communication with the second processor 210. The second processor 210 can receive data associated with one or more sequences of sub-pixel shifted LR projection images from the light detector 150. The second processor 210 can also determine a motion vector of the projections 170 at the sensing surface 162 based on the data. The second processor 210 can then use a suitable super resolution algorithm (SR algorithm) to generate one or more HR (e.g., sub-pixel resolution) images of the specimen 150 based on the motion vector and data of one or more sequences of sub-pixel shifted LR projection images. The second processor 210 is in electronic communication with the second processor 210 to display the HR images and/or other images.

In an exemplary imaging run of the SPLM system 10 of FIG. 1, the scanning illumination source 110 scans or otherwise translates the light element 117 to a two-dimensional (n×m) array of n×m scanning positions having the coordinates $(x_{i=1 \text{ to } n}, y_{j=1 \text{ to } m})$ on the display surface 119. The scanning illumination source 110 scans (sweeps) or otherwise translates the light element 117 to scanning positions according to a scanning pattern. Illumination 118 from the light element 117 at the different scanning locations generates shifted projections 170 of the specimen 150 on the sensing surface 162 of the light detector 160. During scanning, the light detector 160 captures one or more sequences of sub-pixel shifted LR projection images at the sensing area 164. The second processor 210 receives data for at least one of the sequences from the light detector 160. The second processor 210 can determine a motion vector of the sub-pixel shifted projections 170 at the sensing surface 162 from the data. The second processor 210 can also construct one or more HR images of the specimen 150 using a suitable super-resolution algorithm with the data from at least one of the sequences of sub-pixel shifted LR projection images of the specimen 150 and/or the determined motion vector.

Figure 2:
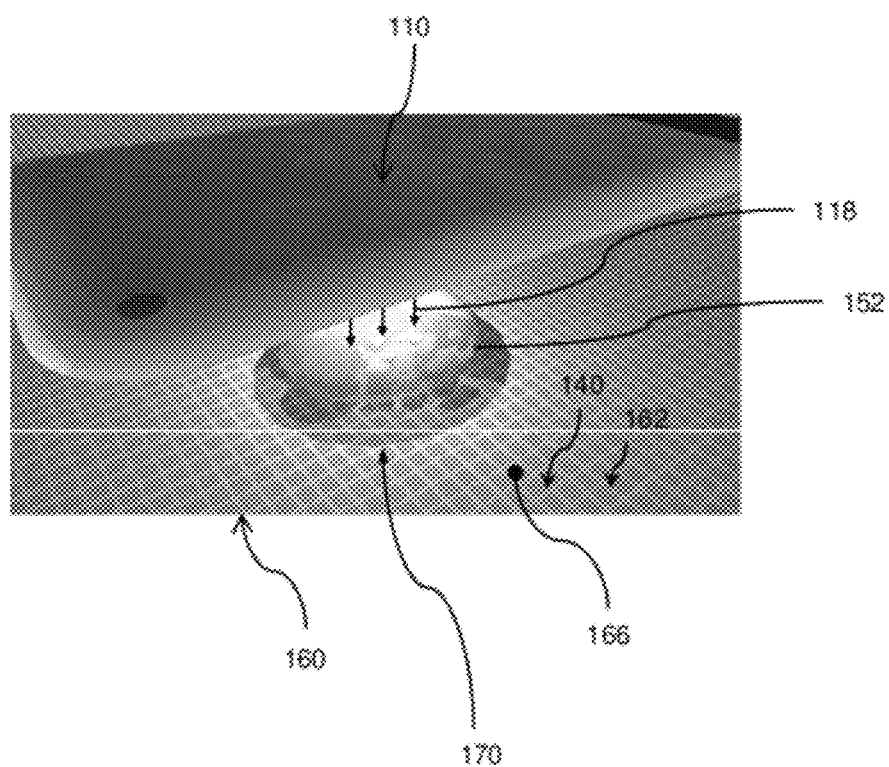
FIG. 2 is a drawing of a perspective view of components and partial components of an SPLM device, according to embodiments of the invention.

FIG. 2 is a drawing of a perspective view of components and partial components of an SPLM device 100, according to embodiments of the invention. The SPLM device 100 includes a scanning illumination source 110 in the form of a mobile communication device (e.g., cell phone, tablet, etc.) and a light detector 160 in the form of a two-dimensional array of light detecting elements 166 (e.g., CMOS imaging sensor). The light detector 160 has a sensing surface 162 and a thin transparent layer 165. A specimen 150 comprising a single object 152 (e.g., cell) is located on the specimen surface 140 (not shown). The thin transparent layer 165 lies between the sensing surface 162 and the specimen surface 140. In this example, scanning illumination device 110 includes an illuminating display 116 (not shown) in the form of an LCD. The LCD includes a two-dimensional array of light emitting elements (e.g., pixels). The scanned light element 117 is in the form of subsequent sets of light emitting elements on the LCD 116 providing illumination 118 according to a scanning pattern. Each set may include one or more light emitting elements. The subsequent sets of light emitting elements provide illumination 118 at the two-dimensional (n×m) array of n×m scanning locations at $(x_{i=1 \text{ to } n}, y_{j=1 \text{ to } m})$ on the display surface 119. In FIG. 2, the light element 117 is shown at a single scanning location in the scanning cycle. The illumination 118 from the light element 117 generates a single projection 170 of the object 152 on the sensing surface 162 of the light detector 160.

FIGS. 3(a), 3(b), and 3(c) are drawings of perspective views of components and partial components of an SPLM device 100 during a scanning cycle of an imaging run, according to embodiments of the invention. The SPLM device 100 includes a scanning illumination source 110 providing illumination 118 and a light detector 160 in the form of a two-dimensional array of light detecting elements 166. The light detector 160 has a sensing surface 162 and a thin transparent layer 162. A specimen 150 comprising a single object 152 (e.g., cell) is located on the specimen surface 140. The thin transparent layer 165 lies between the sensing surface 162 and the specimen surface 140. The SPLM device 10 also includes an x-axis, a y-axis, and a z-axis. The x-axis and y-axis lie in the plane at the sensing surface 162 of the light detector 160. The z-axis is orthogonal to this plane. The light element (not shown) 117 provides illumination 118 and generates light spots on the light detector 160.

In FIGS. 3(a), 3(b), and 3(c), the light element 117 (not shown) is located at three scanning positions along the x'-axis at times: $t=t_a$, $t_b$, and $t_c$ (a>b>c), respectively. Illumination 118 is shown from three different scanning position to generate three shifted projections 170(a), 170(b), and 170(c) on the sensing surface 162, respectively. With certain shifts of the light element 117, the object's projection (shadow) can be shifted at sub-pixel (i.e. smaller than pixel size) increments across the light detecting elements 166 (e.g. sensor pixels) of the light detector array. At times: $t=t_1$, $t_2$, and $t_3$, the light detector 160 captures a sequence of three LR projection images corresponding to the three projections 170(a), 170(b), and 170(c), respectively. Any suitable number of sub-pixel shifted projections may have been captured at scanning times between times, $t_a$ and $t_b$, or between times, $t_b$ and $t_c$. A motion vector of the projections 170(a), 170(b), and 170(c) at the sensing surface 162 can be determined based on the data from a sequence of sub-pixel shifted LR projection images. An HR image of the object 152 can be constructed using a suitable SR algorithm and based on the data from a sequence of sub-pixel shifted LR projection images captured by the light detector 160.

Any suitable specimen 150 may be imaged by the SPLM system 10 or the SPLM device 100. In most cases, the specimen 150 is stationary during a scanning cycle. An example of a suitable specimen 150 is a confluent sample (e.g., confluent cell cultures) having one or more objects 152 (e.g., cells). Another example of a suitable specimen 150 is a sample in which the objects 152 are contiguously connected. The specimen 150 being imaged may include any suitable type(s) of object(s) 150 and may include any suitable number (e.g., 1, 10, 100, 1000, etc.) of objects 150 or portion(s) of an object 150. Suitable types of objects 150 can be biological or inorganic entities. Examples of biological entities include whole cells, cell components, microorganisms such as bacteria or viruses, cell components such as proteins, etc. Inorganic entities may also be imaged by embodiments of the invention.

As used herein, a scanning illumination source 110 can refer to any suitable device or combination of devices capable of scanning or otherwise translating a light element 117 to n scanning positions to generate sub-pixel shifted projections 170 of a specimen 150 being imaged at a sensing surface 162 of a light detector 160. Any number, n, of scanning positions can be used (n=1, 2, 3, 4, 5, 10, 20, 100 etc.). By moving the light element 117, the scanning illumination source 110 changes the illumination angles of the illumination 118 provided to the specimen 150. In embodiments, the scanning illumination source 110 moves the light element 117 to scanning locations that generate a small range of illumination angles (e.g., +/−2 degrees) in X/Y around the normal to the sensing surface or other plane of interest.

An example of a suitable scanning illumination device 110 is a mobile communication device (e.g., cell phone, tablet, etc.). Suitable scanning illumination sources 110 commercially available. Illustrated examples of a suitable scanning illumination device 110 in the form of a smartphone are shown in FIGS. 2 and 4. Another example of a suitable scanning illumination device 110 may be a tomographic phase microscope that uses a spatial light modulator to scan illumination.

In embodiments, the scanning illumination source 110 may include an illuminating display 116 for scanning the light element 117 to generate sub-pixel shifted projections 170 at the sensing surface 162. An illuminating display 116 can refer to any suitable display capable of translating a light element 117 to scanning locations across at least a portion of a display surface 119. Suitable illuminating displays 116 are commercially available. Some examples of suitable illuminating displays 116 include monochromatic, color, or grayscale LCDs, LED displays (e.g., display panels), television screens, LCD matrixes, etc. In these embodiments, the illuminating display 116 may include a two-dimensional array of light emitting elements (e.g., pixels). The array of light emitting elements may have any suitable dimension (e.g., 1000×1000, 1000×4000, 3000×5000 etc.). The display surface 119 can refer to a surface of the illuminating display 116 that provides illumination 118. For example, the scanning illumination source 110 may be in the form of a smartphone with an illuminating display 116 in the form of an LCD screen, as shown in FIGS. 2 and 4. In other embodiments, the scanning illumination source 110 may include another device or combination of devices capable of scanning the light element 117 to generate sub-pixel shifted projections 170 at the sensing surface 162.

The scanning illumination source 110 may be held at a fixed position relative to the light detector 160 and the transparent layer 165 during scanning in some embodiments. In these embodiments, the SPLM 100 may include a suitable structure (e.g., platform, frame, etc.) or structures to hold the scanning illumination source 110 and light detector 160 in a fixed position. In some cases, such as the illustrated example of FIG. 1, the scanning illumination source 110 may be held such that the display surface 119 is kept approximately parallel to the sensing surface 162 of the light detector 160 and at a distance, d, from the sensing surface 162 during scanning. In these cases, the illuminating display 116 may provide illumination 118 at angles normal to the display surface 119. In other cases, the scanning illumination source 110 may be held so that the display surface 119 may be tilted at an angle from normal. At this angle, projections 170 from more extreme illumination angles to be captured, leading to a more complete 3D reconstruction in some cases. In one embodiment, the scanning illumination source 110 may include actuator(s) and controller(s) or other mechanism to reposition the illuminating display 116 (e.g., LCD array) at an angle from normal.

A light element 117 can refer to a suitable device capable of providing illumination 118. The properties of the illumination 118 generated by the light element 117 can have any suitable values. Some properties of the illumination 118 include intensity, wavelength, frequency, polarization, phase, spin angular momentum and other light properties associated with the illumination 118 generated by the light element 117. In embodiments, the illumination 118 is incoherent light.

In embodiments with an illuminating display 116 in the form of a two-dimensional array of light emitting components (e.g., pixels), a light element 117 at a particular scanning time, t may be a set of a suitable number (e.g., 1, 5, 10, 100, etc.) of illuminated light emitting components (e.g., LCD lit/pixel) in the two-dimensional array (e.g., LCD array). Each light emitting component may have a scanning location denoted as $(x_i, y_j)$ where i=1 . . . N; and j=1 . . . N. The light element 117 may be the illuminated pixels in the array at a scanning time in the scanning cycle. The scanning location of a light element 117 can refer to the coordinates of the center of the set of illuminated light emitting elements in this case. In these embodiments, sequentially illuminated sets of light emitting components(s) on an illuminating display 116 can generate light elements 117 at different scanning locations during a scanning cycle.

The properties (e.g., size, properties of the illumination 118, shape, etc.) of the light element 117 may have any suitable value. In embodiments, one or more properties of the light element 117 may vary at different scanning locations in a scanning cycle. In other embodiments, the properties of the light element 117 may be constant during the scanning cycle. Some examples of suitable shapes of a light element 117 are a rectangle, circle, spot, bar, etc. In embodiments with an illuminating display 116 in the form of a two-dimensional array of light emitting elements, the properties of the light element 117 can be varied by varying the number of light emitting components in the set of light emitting components (e.g., pixels) forming the light element 117. For example, the intensity of the illumination 118 generated by the light element 117 can be varied by changing its number of light emitting components (e.g., pixels). In embodiments, one or more properties of the illumination 118 generated by the light element 117 may change at different scanning locations.

In embodiments, the intensity of the illumination 118 generated by the light element 117 may be controlled by varying the size of the light element 117. In one embodiment, the size of the light element 117 may vary at different scanning locations to generate light at approximately the same intensity at a single point at the plane of the sensing surface 162. In this embodiment, the size, S of the light element 117 at a scanning location can be proportional to the distance, L, from the scanning location to a suitable location such as: a) the center of the array of scanning locations, or b) the center of an illuminating display 116 such as the center of an LCD on a smartphone. For example, the size, S of the light element 117 at a scanning location may be defined as: $S=S_{center} \times (1+L)$, where $S_{center}$ is the size of the light element 117 at the center of the array of scanning locations. In this way, the light intensity received at a location at the sensing surface 162 normal to the center of the scanning locations on the display surface 119 can be kept about constant in some cases. As another example, the size S of the light element 117 at a scanning location in a scanning cycle may be defined as: $S=S_A \times (1+A)$, where $S_A$ is the size of the light element 117 at a location A of an illuminating display 116, A is the distance from the scanning location to the location A.

In one embodiment, the light element 117 can provide illumination 118 of n different wavelengths $\lambda_1, \ldots, \lambda_n$ at different scanning times during a scanning cycle. The illumination 118 may be sequentially cycled through a series of different wavelengths as the light element 117 moves through scanning locations in a scanning cycle in some examples. In one example, the light element 117 can provide RGB illumination of three wavelengths $\lambda_1$, $\lambda_2$, and $\lambda_3$ corresponding to red, green, blue colors, respectively. The light element 117 may provide illumination 118 of the three wavelengths $\lambda_1$, $\lambda_2$, and $\lambda_3$ sequentially during scanning times of a scanning cycle. In one case, at a scanning time $t_1$ illumination 118 may have a wavelength of $\lambda_1$, at $t_2$ illumination 118 may have an wavelength of $\lambda_2$, at $t_3$ illumination 118 may have a wavelength of $\lambda_3$, at $t_4$ illumination 118 may have a wavelength of $\lambda_1$, at $t_5$ illumination 118 may have a wavelength of $\lambda_2$, etc.

A scanning location can refer to the center of the light element 117. Any suitable number (e.g., 1, 100, 1000, etc.) of scanning locations may be used in a scanning cycle. As a group, the scanning locations in a scanning cycle may cover any suitable area. In embodiments with a display surface 119, the scanning locations may cover the entire display surface 119 or may cover a portion of the display surface 119.

To shift projections 170 of the specimen 152 at the sensing surface 162, the scanning illumination source 110 can translate the light element 117 to different scanning locations generating different illumination angles. To generate a sequence of sub-pixel shifted projections 170 of the specimen 152 at the sensing surface 162 in some embodiments, the scanning illumination source 110 may move the light element 117 to a plurality of scanning locations designed to generate sub-pixel shifted projections 170. In this case, neighboring scanning locations in the plurality of scanning locations correspond to a sub-pixel shift of neighboring projections images 170 in the sequence of projection images. Neighboring scanning locations can refer to two scanning locations that are proximal in distance. In some cases, neighboring scanning locations may also be locations that are sequential in time having sequential scanning times during a scanning cycle.

The scanning locations may form any suitable arrangement (e.g., array, circle, square, triangle, etc.). In embodiments, the scanning locations may be in the form of an array (e.g., one-dimensional array, two-dimensional array, or combination of one-dimensional and two-dimensional arrays) of scanning locations. In these embodiments, the array of scanning locations may have any suitable dimension (e.g. 1×100, 1×10, 100×100, 3000×20, 400×300 etc.). For example, the scanning locations may be arranged in a two-dimensional (n×m) array of n×m scanning locations at $(x_{i=1\ to\ n}, y_{j=1\ to\ m})$.

In embodiments with an illuminating display 116 (e.g., LCD display) in the form of a two-dimensional array of light emitting elements (e.g. pixels), the scanning locations of the light element 117 can refer to subsequently illuminated light emitting elements in the two-dimensional array. In these embodiments, the scanning locations of the light element 117 may be located at the display surface 119. For example, the scanning locations may be in the form of a two-dimensional (n×m) array of n×m scanning locations at $(x_{i=1\ to\ n}, y_{j=1\ to\ m})$ on the display surface 119.

In embodiments, the scanning illumination source 110 the light element 117 during a scanning cycle according to a scanning pattern. A scanning pattern can refer to a description of the scanning locations (i.e. locations of the light element 117) at different times during a scanning cycle and properties (e.g., size, shape, etc.) of the light element 117 at each scanning location in the scanning cycle. For example, a scanning pattern may include a two-dimensional array of scanning locations and a description that the light element 117 moves through each row sequentially at a constant rate. In another example, the scanning pattern may include a two-dimensional array of scanning locations and a description that the element moves through each column sequentially at a constant rate. As another example, the scanning pattern may include a two-dimensional array of scanning locations and a description that the element moves through the array randomly. The scanning pattern may also include the amount of sub-pixel shift desired between subsequent LR images. The scanning pattern may also include the total number of LR projection images and/or HR images desired. The scanning pattern may be stored as code on the first CRM 114 or the second CRM 220. In embodiments with a scanning illumination source 110 in the form of a smartphone such as in FIG. 4, the scanning pattern may be an application (App) stored in the memory of the smartphone.

In embodiments such as the illustrated example of FIG. 1, the SPLM device 100 also includes a transparent layer 165 located between the specimen surface 140 and the sensing surface 162. The transparent layer 165 can separate the specimen 150 from the light sensitive region of the light detector 160. The transparent layer 165 may be made of any suitable material such as Polydimethylsiloxane (PDMS).

The transparent layer 165 may have any suitable thickness (e.g., thickness in the range of several hundred nanometers to microns). In some cases, the transparent layer 165 may be a layer placed on the light detector 160. For example, the transparent layer 165 may be a passivation layer coated or deposited on top of an imaging sensor chip. In other cases, the transparent layer 165 may be separate from the light detector 160. In other embodiments, the SPLM device 100 does not have a transparent layer 165 and the sensing surface 162 is coincident with the specimen surface 140.

The distance between neighboring projections 170 is proportional to the thickness of the transparent layer 165 and the tilt/shift extent of the light element 117. The tilt/shift extent of the light element 117 can refer to the distance or illumination angle change between neighboring scanning locations. In some embodiments, the distance between neighboring scanning locations in a plurality of the scanning locations of a scanning cycle can be designed to generate sub-pixel shifted projections 170. In these cases, the distance between the neighboring scanning locations can be determined based on the thickness of the transparent layer 165 and the required incremental sub-pixel shifts between neighboring projections 170.

In embodiments, the distance between neighboring scanning locations in a plurality of scanning locations may be determined to generate sub-pixels shifts between neighboring projections 170 in a sequence of projection images. In these embodiments, the determined distance between neighboring scanning locations in the plurality of scanning locations directly corresponds to a sub-pixel shift of a projection 170 at the sensing surface 162. In these embodiments, the plurality of scanning locations directly corresponds to a sequence of sub-pixel shifted projection images.

In embodiments, the distance between neighboring scanning locations may be a suitable value. In some cases, the distance between neighboring scanning locations in a given scanning cycle may be constant. In other cases, it may vary.

A scanning rate can refer to the rate of shifting between sequential scanning locations in a scanning cycle per unit in time. A sampling rate can refer to a rate of projection images (frames) captured by the light detector 160 per unit in time such as frames per second. The sampling/scanning rate may be constant in some embodiments and may vary in other embodiments. In embodiments, the scanning rate and sampling rate are synchronized.

Figure 4A:
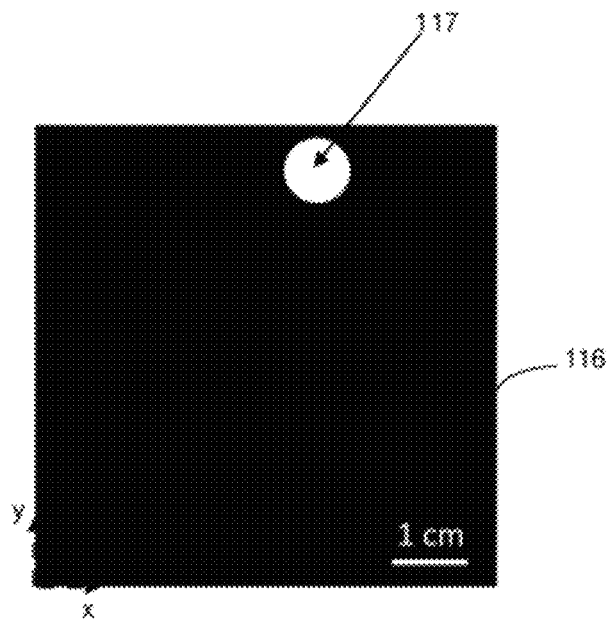
FIG. 4(a) and FIG. 4(b) are diagrams illustrating a scanning pattern on an illuminating display, according to embodiments of the invention.
Figure 4B:
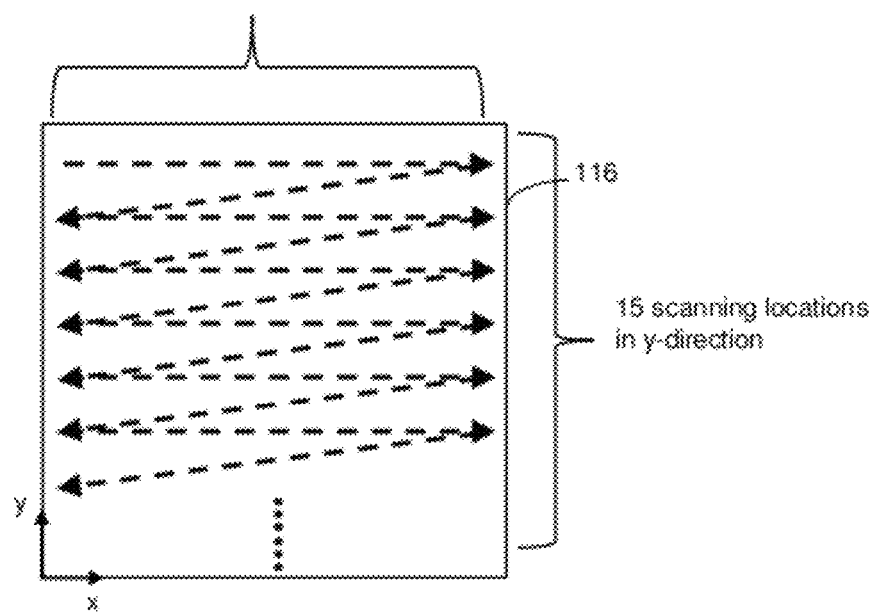

FIG. 4(a) and FIG. 4(b) are diagrams illustrating a scanning pattern on an illuminating display 116, according to embodiments of the invention. In this example, the scanning illumination source 110 is in the form of a smartphone and the illuminating display 116 is in the form of an LCD screen of the smartphone. The LCD screen includes a two-dimensional array of pixels of a 640×640 pixel size. During scanning, the smartphone may be located at a suitable distance, d above the light detector 160 (e.g., image sensor chip). The display surface 119 of the illuminating display 116 and the sensing surface 162 of the light detector 160 may be kept approximately parallel. The smartphone may be located so that the center of the display surface 119 of the illuminating display 116 is above the sensing area 164 of the sensing surface 162 of the light detector 160. The illuminating display 116 includes an x-axis and a y-axis. The x-axis and y-axis lie in the plane at the display surface 119 of the illuminating display 116.

FIG. 4(a) shows a light element 117 comprising a set of about 640 pixels in the form of a bright circular spot of about 1 cm in diameter on the illuminating display 116. The light element 117 is shown at a scanning location at a scanning time during a scanning cycle. The light element 117 may be located at the display surface 119 of the illuminating display 116.

In FIG. 4(b), the diagram of the scanning pattern includes a 15×15 array of scanning locations (steps) of the light element 117 during the scanning cycle. The scanning locations are shown at locations along the x-axis and y-axis in the plane of the display surface 119 of the illuminating display 116. In the illustrated example, the scanning pattern includes 15 scanning locations in the x-direction and 15 scanning locations in the y-direction. In this example, the light detector 160 may capture 225 LR projection images based on the 225 scanning locations in the scanning patter. The array of scanning positions may be centrally located within the illuminating display 116. The arrows in FIG. 4(b) designate the order of the scanning locations during the scanning cycle. In this case, the light element 117 moves sequentially through each row of the two-dimensional array of scanning locations in the scanning pattern. If the light element 117 remains a constant size as it moves away from the center of the display surface 119, the intensity readout from the light detector 160 (e.g., image sensor chip) will decrease because of the large incident angle. To maintain a more constant intensity readout, the size of the light element 117 (e.g., bright spot size) can be linearly increased as it moves away from the center of the illuminating display 116 (e.g., smartphone screen) in one embodiment.

Returning to FIG. 1, the scanning illumination source 110 includes a first processor 112 in electronic communication with the illuminating display 116 and a first CRM 114 in communication with the first processor 112. The first processor 112 (e.g., microprocessor) can execute code stored on the first CRM 114 (e.g., memory) to perform some of the functions of the scanning illumination source 110. For example, the first processor 112 may execute code with a scanning pattern stored on the first CRM 114. The CRM 114 may include, for example, code with a scanning pattern, other code for scanning a light element 117, and other codes for other functions of the scanning illumination source 110. The first CRM 114 may also include code for performing any of the signal processing or other software-related functions that may be created by those of ordinary skill in the art. The code may be in any suitable programming language including C, C++, Pascal, etc.

In embodiments, the light detector 160 may be in electronic communication with the first processor 112 of the scanning illumination source 110 to synchronize sampling of the light detector 160 with the light element 117 being located at a scanning position. In these embodiments, the sampling rate of the light detector 160 may be synchronized with the scanning rate of the scanning illumination source 110 to capture at least one projection image 170 at each scanning location. In one embodiment, an electronic start sampling signal may be sent to the light detector 160 from scanning illumination source 110 to capture an LR projection image when the light element 117 is at a scanning location.

The SPLM device 100 also includes a light detector 160 (e.g., CMOS imaging sensor). A light detector 160 can refer to any suitable device or combination of devices capable of capturing projection images 170 and generating one or more signals with data associated with the projection images 160 captured and other data associated with imaging. The signals with data may be in the form of an electrical current from the photoelectric effect.

The light detector 160 includes a sensing surface 162. A sensing surface 162 can refer to the active sensing layer of the light detector 160. The sensing surface 162 includes a sensing area 164. The sensing area 164 refers to a suitable area of the sensing surface 162 that actively captures projections 170 during a scanning cycle. In some cases, the entire area of a sensing surface 162 is the sensing area 164. In embodiments, the specimen 150 being imaged may be located in an area of the specimen surface 140 proximal the sensing area 162. The light detector 160 also includes a local x' axis and y' axis at a plane of the sensing surface 162.

In embodiments, the light detector 160 includes discrete light detecting elements 166 (e.g., pixels) in the form of a two-dimensional array of light detecting elements 166, as shown in FIGS. 2 and 3. The light detecting elements 166 may be located on or within a surface layer of the light detector 160 at the sensing surface 162. Although the two-dimensional array of light detecting elements 166 is oriented so that the x'-axis is parallel to the x-axis of the illuminating display 116 as shown in FIGS. 2 and 3, the two-dimensional array may be oriented at any suitable angle in other embodiments.

Any suitable light detector 160 can be used. Some examples of suitable light detectors 160 having two-dimensional arrays of light detecting elements 166 include a charge coupled device (CCD) array, a CMOS imaging sensor array, an avalanche photo-diode (APD) array, a photo-diode (PD) array, and a photomultiplier tubes (PMT) array. These light detectors 160 and others are commercially available. Also, the light detector 160 can be a monochromatic detector or a color detector (e.g., RGB detector).

The light detecting elements 166 may be of any suitable size (e.g., 1-10 microns) and any suitable shape (e.g., circular, rectangular, square, etc.). For example, a CMOS or CCD light detecting element 166 may be 1-10 microns and an APD or PMT light detecting element 166 may be as large as 1-4 mm.

Due to the scattering angle of light 118 passing through a specimen 150 being imaged, projection image quality can be degraded if the specimen 150 is located away from the sensing surface 162 of the light detector 160. In embodiments, the light detector 160 does not have a color filter and microlens layer in order to decrease the acceptance angle of each light detecting element and the distance between the object 152 and the sensing surface 120 (i.e. the active sensing layer). If the light detector 160 (e.g., a CMOS imaging sensor chip) was prefabricated with a color filter and a microlens layer, these components may be removed to decrease the acceptance angle of each pixel and the distance between the object 152 and the surface layer.

In embodiments, the transparent layer 165 may be placed, during fabrication, on the light detector 160. Semiconductor and/or micro/nanofabrication procedures may be used to place the transparent layer 165 on the light detector 160. In some cases, the transparent layer 165 may be placed on the light detector 160 after the color filter and microlens layer have been removed. In one case, the color filter and microlens layer may be removed by treating the pre-fabricated imaging sensor under oxygen plasma for a period of time (e.g., 10 minutes at 80W). The transparent layer 165 may be placed onto the imaging sensor after the removal of the color filter and microlens layer or may be placed on a light detector with the layer. In one case, the transparent layer 165 may be prepared by mixing 1:10 with base and curing agent, then spin coated on a 3 in. silicon wafer followed by baking at 80 degrees C.

Light data can refer to any suitable information related to the one or more projections 170 captured by the light detecting elements 166 of the light detector 160. For example, light data may include information about the properties of the projection light received such as the intensity(ies) of the light, the wavelength(s) of the light, the frequency or frequencies of the light, the polarization(s) of the light, the phase(s) of the light, the spin angular momentum(s) of the light, and/or other light properties associated with the light received by the light detecting element 166. Light data may also include the location of the receiving light detecting element(s) 166, the time that the light was received (sampling time or scanning time), or other information related to the projection 170 received. In embodiments, each light detecting element 166 can generate a signal with light data based on light associated with the projection 170 and received by the light detecting element 166.

An LR projection image (frame) can refer to a snapshot image sampled (captured) by the light detector 160 at a sampling time occurring during a scanning cycle. In embodiments, the light detector 160 captures a LR projection image at each scanning time. Each LR projection image sampled by the light detector 160 can be used to display a 2D, LR projection image. In embodiments with a color light detector 160, the LR projection image may be a color image. In embodiments with a monochromatic light detector 160, the LR projection image may be a black and white image.

Each sequence of sub-pixel shifted LR projection images can refer to n LR projection images sampled at n sampling times where neighboring projection images in time are separated by less than a pixel size (i.e. sub-pixel shift). During a scanning cycle, n LR projection images ($I_1, \ldots, I_n$) may be captured at n sequential sampling times ($t_1, \ldots t_n$). Any suitable number, n (e.g., 1, 3, 5, 10, 100, etc.) of LR projection images may be captured during a scanning cycle. Also, any suitable number (e.g., 1, 3, 5, 10, 100, etc.) of sequences of sub-pixel shifted LR projection images may be captured by the light detector 160 during a scanning cycle. If multiple sequences are captured, the sequences can include different groups of LR projection images or the sequences can overlap sharing one or more LR projection images. In one example, 9 LR images ($I_1, I_2, I_3, I_4, I_5, I_6, I_7, I_8, I_9$) may be captured at 9 sequential sampling times ($t_1, t_2, t_3, t_4, t_5, t_6, t_7, t_8, t_9$). In an overlapping case of the above example, sequences could be: 1) $I_1, I_2, I_6$, and $I_8$, and, 2) $I_6, I_7, I_8$, and $I_9$. In a non-overlapping case, sequences could be: 1) $I_1, I_2, I_3$, and $I_4$, and 2) $I_5, I_6, I_7$, and $I_8$. In others examples, a sequence of sub-pixel shifted LR projection images may be based on non-sequential sampling times. For example, 9 LR images ($I_1, I_2, I_3, I_4, I_5, I_6, I_7, I_8, I_9$) may be captured at 9 sequential sampling times ($t_1, t_2, t_3, t_4, t_5, t_6, t_7, t_8, t_9$) and the sequence of projection images may be ($I_6, I_2, I_9, I_1$).

In embodiments, the light detector 160 may capture a LR projection image at each scanning time during a scanning cycle. For example, a light detector 160 may capture an LR projection image associated with each scanning location in the scanning pattern shown in FIG. 4(*b*). In this example, the light detector 160 may capture an LR projection image at each scanning time as the light element 117 moves through each row sequentially of the two-dimensional array of scanning locations in the scanning pattern. If scanning locations in each row are associated with sub-pixel shifted projections 170, the light detector 160 may capture 15 sequences of sub-pixel shifted projection images during the scanning cycle. In this case, each sequence is associated with a row of scanning locations in the scanning pattern.

A motion vector can refer to the translational motion of projection images in a sequence of LR projection images, collectively termed the motion vector of the sequence of LR projection images. The motion vector is based on the amount of shifting of the projection images at a plane. A motion vector of a sequence of sub-pixel shifted LR projection images can be calculated from the associated projection images captured by the light detector 160. The motion vector may be calculated at any plane of interest. For example, the motion vector can be determined at the plane at the sensing surface 162. In this example, the motion vector is determined in terms of the local x'-axis and y'-axis at the sensing surface 162 of the light detector 160. As another example, the motion vector can be calculated at other planes through an object 152 being examined. The planes through the object 152 may be parallel to the plane of the sensing surface 162 in some cases.

In embodiments, an HR image of a specimen 150 can be constructed using a suitable super resolution (SR) algorithm based on data associated with a sequence of sub-pixel shifted LR projection images and a motion vector of the sub-pixel shifted LR projections in the sequence. An example of image resolution obtainable by embodiments of the SPLM system 10 may be about 0.66 micron.

An SR algorithm can refer to an image processing technique that constructs a HR image (e.g., sub-pixel resolution image) from a sequence of sub-pixel shifted LR projection images. Any suitable SR algorithm can be used by embodiments of the SPLM system 10. An example of a suitable SR algorithm is a shift-and-add pixel SR algorithm. Some examples of suitable SR algorithms can be found in Lange, D., Storment, C. W., Conley, C. A., and Kovacs, G. T. A., "*A microfluidic shadow imaging system for the study of the nematode Caenorhabditis elegans in space*," Sensors and Actuators B Chemical, Vol. 107, pp. 904-914 (2005) ("Lange"), Wei, L., Knoll, T., and Thielecke, H., "On-chip integrated lensless microscopy module for optical monitoring of adherent growing mammalian cells," Engineering in Medicine and Biology Society (EMBC), 2010 Annual International Conference of the IEEE, pp. 1012-1015 (2010) ("Wei"), Milanfar, P., Super-Resolution Imaging, (CRC Press, 2010) ("Milanfar"), and Hardie, R., Barnard, K., and Armstrong, E., "*Joint MAP registration and high-resolution image estimation using a sequence of undersampled images*," IEEE Transactions on Image Processing 6, pp. 1621-1633 (1997) ("Hardie"), which are hereby incorporated by reference in their entirety for all purposes. An example of a suitable super algorithm is the general pixel super resolution model and solution described in Section V.

The SPLM system 10 of FIG. 1 also includes a host computer 200 communicatively coupled to the light detector 160. The host computer 200 comprises a second processor 210 (e.g., microprocessor), a second CRM 220, and an image display 230. The image display 230 and the second CRM 220 are communicatively coupled to the second processor 210. Alternatively, the host computer 200 can be a separate device from the SPLM system 10. The host computer 200 can be any suitable computing device (e.g., smartphone, laptop, tablet, etc.)

The second processor 230 executes code stored on the second CRM 220 to perform some of the functions of SPLM 10 such as, for example: interpreting data from one or more sequences of sub-pixel shifted LR projection images captured and communicated in one or more signals from the light detector 160, determining a motion vector of a sequence of sub-pixel shifted projections, constructing a 2D HR image from data associated with a sequence of sub-pixel shifted LR projection images, constructing a 3D HR image from data associated with a sequence of sub-pixel shifted LR projection images, displaying one or more HR images on the image display 230, etc.

The second processor 210 can receive one or more signals with light data and other data from the light detector 122. For example, the processor 210 can receive one or more signals with light data associated with one or more sequences of sub-pixel shifted LR projection images sampled at a corresponding sequence of n scanning times ($t_1, t_2, t_3, \ldots t_n$). The second processor 210 can also determine a motion vector based on the sequence of sub-pixel shifted LR projection images. The second processor 210 can also construct HR images and associated image data based the determined motion vector and data associated with at least one sequence of sub-pixel shifted LR projection images. In some cases, the constructed HR image of the object 150 is a black and white 2D/3D image. In other cases, the constructed HR image of the object 150 is a color 2D/3D image.

In one embodiment, a HR color image can be generated by using different wavelengths of illumination 118 at different sampling times to generate a multiple sequences of sub-pixel shifted LR projection images at a light detector 160. Each sequence is associated with a different wavelength. The second processor 210 can generate HR color image and associated image data based on the different sequences associated with different wavelengths. For example, three wavelengths of light (e.g., wavelengths associated with red, green, blue (RGB) colors) can be sequentially generated by a light element 117 to generate three sequences of sub-pixel shifted projection images associated with three wavelengths of light. The processor 210 can combine the image data from the sequences associated with the different wavelengths to generate multi-wavelength or color image data (e.g., RGB color image data). The multi-wavelength or color HR image data can be used to generate a multi-wavelength or color HR image on the image display 230.

The second CRM (e.g., memory) 220 can store code for performing some functions of the SPLM system 10. The code is executable by the second processor 210. For example, the second CRM 220 of embodiments may include: a) code with a SR algorithm, b) code with a tomography algorithm, c) code for interpreting light data received in one or more signals from the light detector 122, d) code for generating a 3D HR image, e) code for constructing a color sub-pixel image, f) code for displaying SR two-dimensional and/or three-dimensional images, g) and/or any other suitable code for performing functions of the SPLM system 10. The second CRM 220 may also include code for performing any of the signal processing or other software-related functions that may be created by those of ordinary skill in the art. The code may be in any suitable programming language including C, C++, Pascal, etc.

The SPLM system 10 also includes an image display 230 communicatively to the processor 210 to receive data and provide output such as HR images to a user of the SPLM system 10. Any suitable display may be used. For example, the image display 230 may be a color display or a black and white display. In addition, the image display 230 may be a two-dimensional display or a three-dimensional display. In one embodiment, the image display 230 may be capable of displaying multiple views of an object 150.

Modifications, additions, or omissions may be made to SPLM system 10 or the SPLM device 100 without departing from the scope of the disclosure. In addition, the components of SPLM 10 or SPLM device 100 may be integrated or separated according to particular needs. For example, the second processor 210 may be integrated into the light detector 160 so that the light detector 160 performs one or more of the functions of the second processor 160 in some embodiments. As another example, the second processor 160, second CRM 220, and image display 230 may be components of a computer separate from the SPLM system 10 and in communication with the SPLM system 10. As another example, the second processor 160, second CRM 220, and/or image display 230 may be integrated into parts of the SPLM device 100. For example, the image display 230 may be part of the illumination display 116, the first processor 112 and second processor 210 may be integrated into a single processor, and/or the first CRM 114 and second CRM 220 may be integrated into a single CRM.

II. Principle and Resolution of Scanning Projection Lensless Microscopy

Nyquist criterion considerations dictate that the raw projection (shadow) image resolution from an image sensor (e.g., CMOS image sensor) may be no better than two times the pixel size. SPLM systems 10 of embodiments use a high sampling rate in the time domain to offset the sub-Nyquist rate sampling in the spatial domain of the projection images, combining work done in super resolution imaging with advanced sensor (e.g., CMOS) technology to produce a low cost, HR microscopy device with significant resolution enhancement.

In embodiments, the SPLM device 100 includes a thin transparent layer 165 between the light detector 160 and the object 152 being imaged. The transparent layer 165 separates the objects 152 (e.g., cells) from the actual light sensitive region of the light detector 160 (e.g., sensor chip). During scanning, the scanning illumination source 110 shifts/scans a light element 117 to scanning locations to provide illumination 118 (e.g., incoherent light) from different illumination angles above the specimen 150. The light detector 160 acquires one or more sequences of LR projection images. With the movement of the illumination 118, the projection image shifts across the light detecting elements 166 (e.g., sensor pixels), as shown in FIG. 3. The amount of shadow shift is proportional to the thickness of the transparent layer 165 tilt/shift extent of the light element 117. As long as the shift between each raw projection image in each sequence of LR projection images is smaller than the physical size of the light detecting element (e.g., pixel size), the information from multiple sub-pixel-shifted LR shadow images can be used to create a single HR image with a suitable super-resolution algorithm.

In previous super resolution microscanning systems, a specimen was mounted to a stage and the stage was scanned in sub-pixel increments. In this prior approach, the position of the stage needed to be accurately controlled in precise sub-pixel steps. Typically, controllers and actuators were used to control the required precise position of the stage. High precision meant high cost of setup and alignment was required by these systems.

In a previous super resolution optofluidic system, optofluidics are incorporated to generate HR images from LR projection images in a high throughput manner. In this system, an optofluidic sample-delivery scheme is employed to capture a sequence of images of the sample translating across a CMOS imaging sensor (pixel) array. The system uses super-resolution processing techniques to achieve HR images from the sequences of LR projection images as described in U.S. patent application Ser. No. 13/069,651, which is hereby incorporated by reference in its entirety for all purposes, and described in Zheng. This method relies upon capturing a sequence of LR projection images of objects (e.g., cells) as they flow through a fluid channel, across a light detector (e.g., CMOS imaging sensor array). However, imaging in this system requires fluidic (e.g., microfluidic) flow of specimens across a scanning area. Adherent, confluent, or contiguously arranged specimens are simply incompatible with imaging in a fluidic mode. For example, in order to make an object flow across the fluid channel, an object cannot attach to the surface of image pixel (i.e. there is distance between the object and the image pixel). Such a distance results in a blurry image of the object. In addition, the field of view can be limited by the geometry of the fluid channel.

In SPLM systems 10, the SPLM devices 100 use a scanning illumination source 110 to scan a light element 117 over the specimen 150. In this approach, there may be no need for precise alignment. The scanning illumination source 110 is located at a much larger distance from the sensing surface 162 than the object 152. Thus, small shifts of the light element 117 correspond to larger shifts of the projections 170 on the sensing surface 162. The scanning illumination source 110 can control the sub-pixel shifts of the projections at the sensing surface 162 directly with more controllable larger shifts of the light element 117 at the scanning illumination source 110. In this way, the scanning illumination source 110 can easily and accurately keep the projection shifts at sub-pixel values than previous systems such as microscanning systems, optofluidic systems, etc. Moreover, without the need of mechanical scanning or microfluidic flow, the speed of scanning can be much faster. The scanning illumination source 110 can scan light at speeds up to the range of kHz regions. This is two orders of magnitude higher than prior mechanical microscanning schemes. In addition, the cost of the SPLM device 100 can be much lower since it uses a scanning illumination source 110 such as a LED screen or LED matrix.

Figure 5:
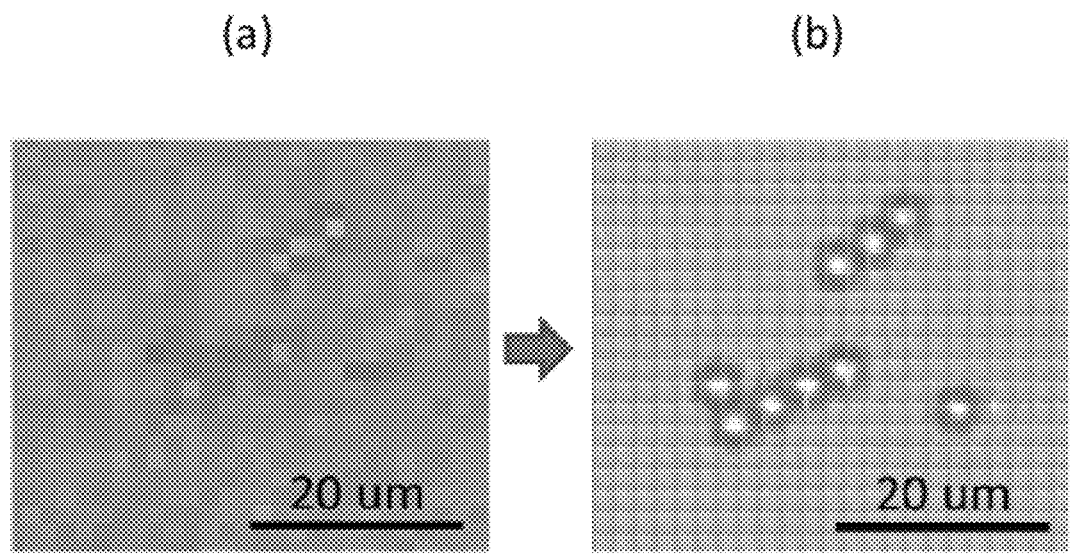
FIG. 5(a) is an LR projection image captured by a light detector of an SPLM system at a single sampling time, according to embodiments of the invention.
FIG. 5(b) is an HR image reconstructed by the SPLM system, according to embodiments of the invention.

FIG. 5(a) is an LR projection image captured by a light detector 160 of an SPLM system 10 at a single sampling time, according to embodiments of the invention. In this example, the specimen 150 being imaged by the SPLM system 10 includes a group of 3 μm microspheres. FIG. 5(b) is an HR image reconstructed by the SPLM system 10, according to embodiments of the invention. The SPLM system 10 reconstructed the HR image based on data from a sequence of sub-pixel shifted LR projection images including the LR projection image shown in FIG. 5(a).

Figure 6:
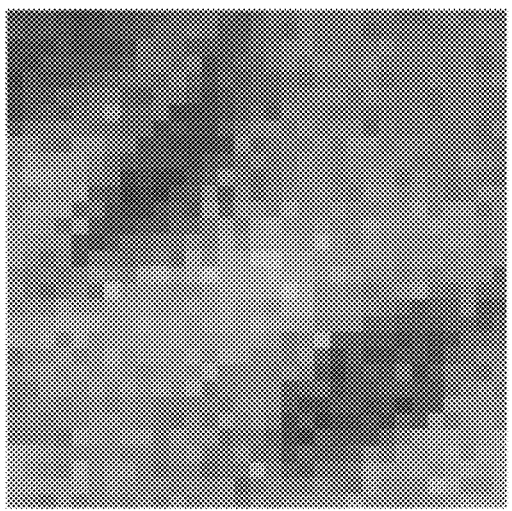
FIG. 6(a) is an LR projection image of a portion of a HeLa cell specimen captured by a light detector of an SPLM system at a single sampling time, according to embodiments of the invention.
FIG. 6(b) is an HR image reconstructed by the SPLM system, according to embodiments of the invention.
Figure 6:
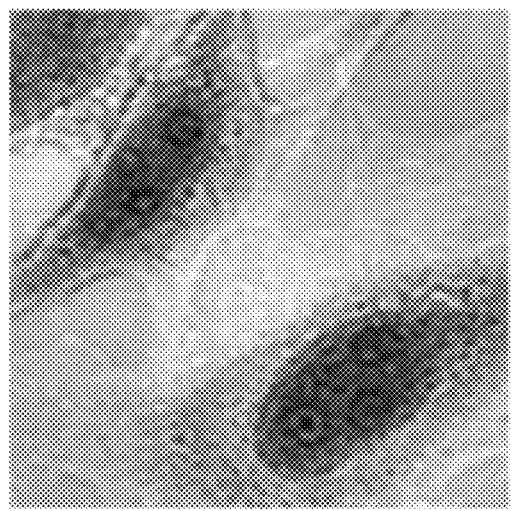

FIG. 6(a) is an LR projection image of a portion of a HeLa cell specimen captured by a light detector 160 of an SPLM system 10 at a single sampling time, according to embodiments of the invention. FIG. 6(b) is an HR image reconstructed by the SPLM system 10, according to embodiments of the invention. The SPLM system 10 reconstructed the HR image based on data from a sequence of 225 sub-pixel shifted LR projection images including the LR projection image shown in FIG. 6(a).

Figure 7:
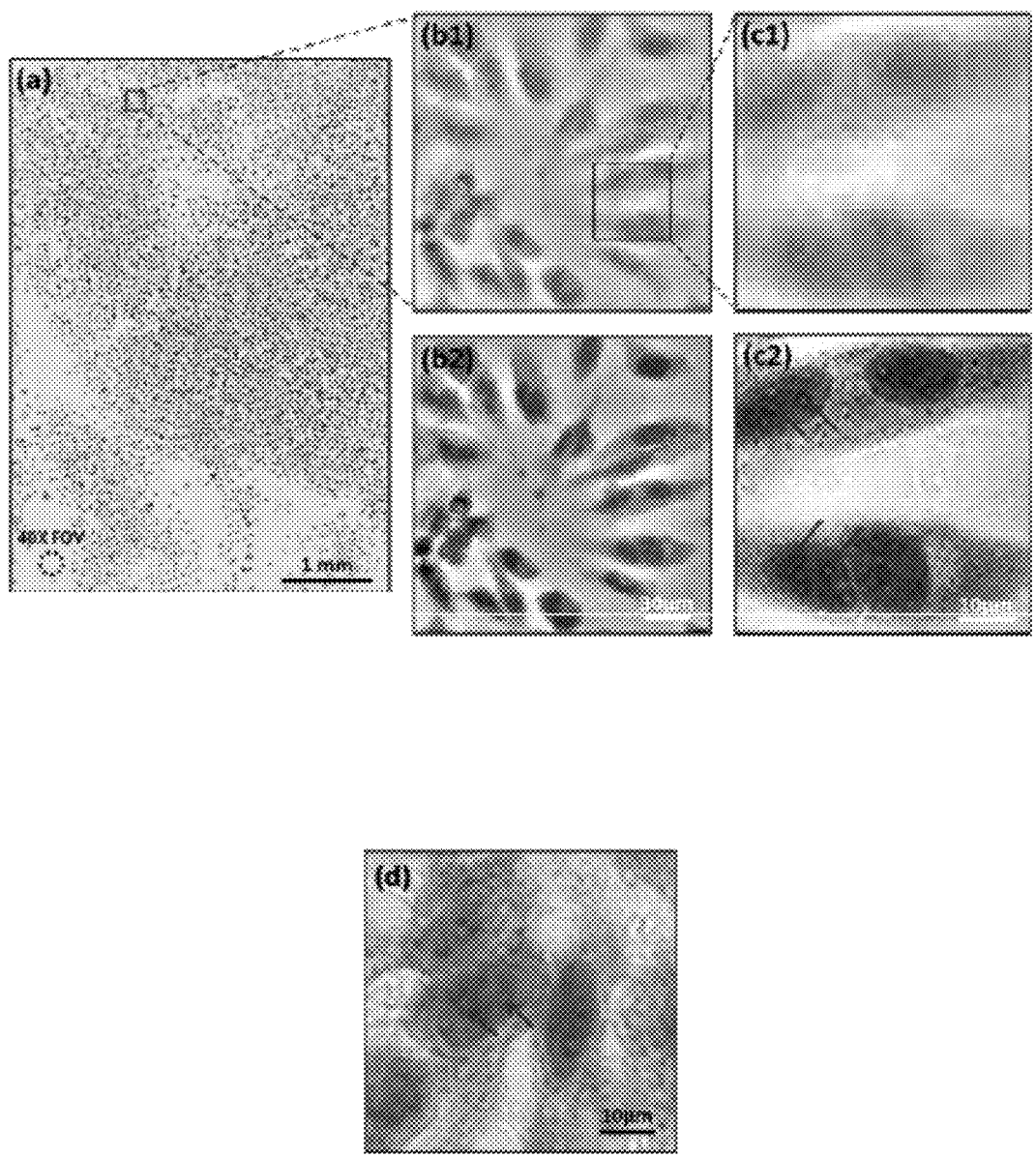
FIG. 7(b1) is an LR projection image from a small region of FIG. 7(a), captured by the light detector of an SPLM system, according to embodiments of the invention.

FIG. 7(a) is a large field of view color HR image of a confluent HeLa cell specimen 150 constructed by an SPLM system 10, according to embodiments of the invention. The specimen 150 was stained with Giemsa. During reconstruction, each pixel at the LR projection image level (2.2 μm) was enhanced into a 13*13 pixel block in the reconstructed HR image. The color HR image contains about $8.45 \times 10^8$ pixels. The sensing area 164 (image area) was 6 mm×4 mm. A 15×15 array of scanning locations for each color illumination 118 was used. FIG. 7(b1) is an LR projection image from a small region of FIG. 7(a) and FIG. 7(c1) is an LR projection image from a small region of FIG. 7(b1), captured by the light detector 160 of an SPLM system 10, according to embodiments of the invention. FIG. 7(*b*2) is a reconstructed HR image from the same small region of FIG. 7(*a*) and FIG. 7(*c*2) is a reconstructed HR image from a small region of FIG. 7(*b*2) constructed by an SPLM system 10, according to embodiments of the invention. FIG. 7(*d*) is a conventional microscopy image of similar cells using a microscope with 40×, NA=0.66 objective lens. From the reconstructed HR images in FIGS. 7(*b*2) and 7(*c*2), organelles within the HeLa cell can be discerned such as multiple nuclear granules (indicated by red arrows), and the nucleus. The reconstructed HR images also closely corresponded to conventional microscopy images acquired from similar cells.

Figure 8:
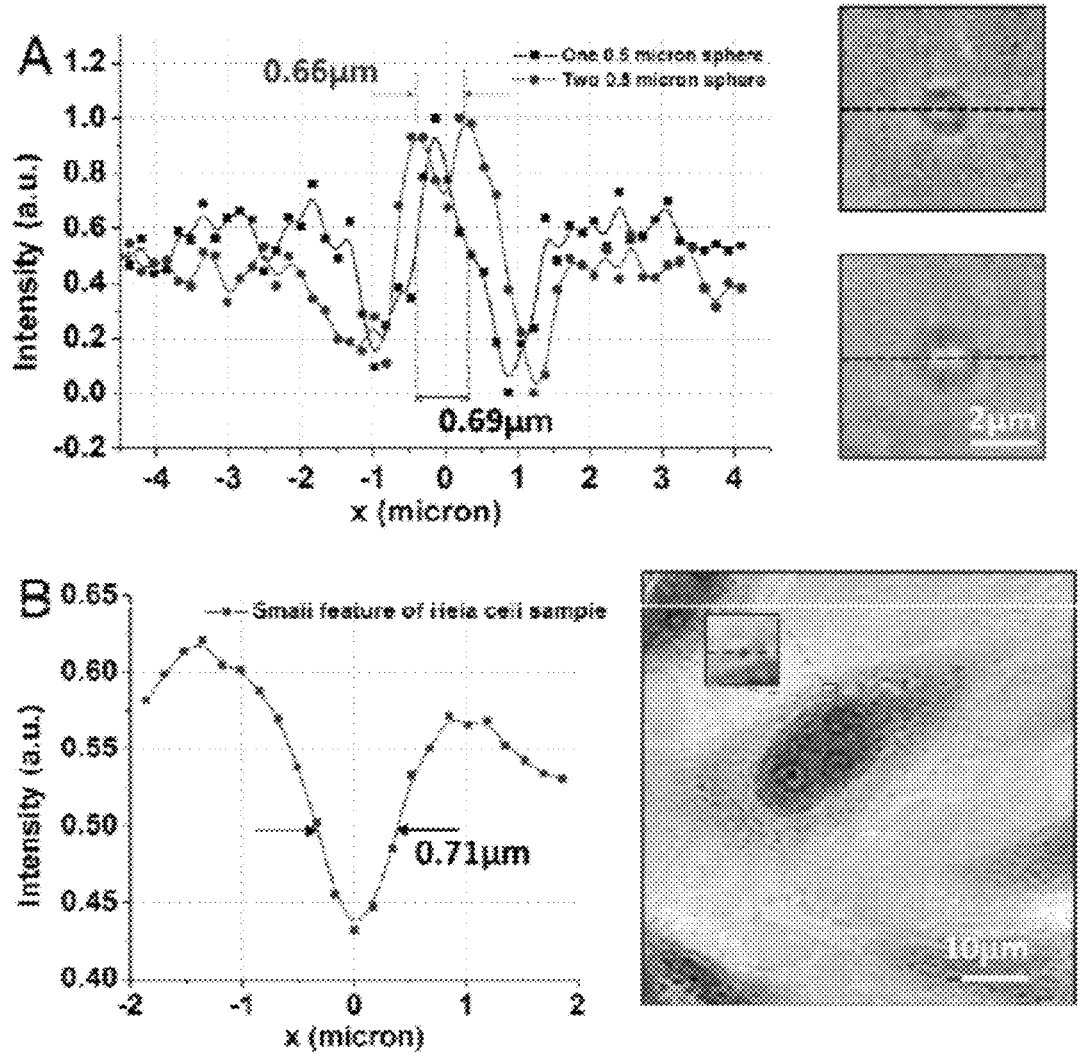
FIG. 8(a) is an HR image of a specimen having 500 nm microspheres (Polysciences) as constructed by an SPLM system, according to embodiments of the invention.
FIG. 8(b) is an HR image of a magnified small feature of the stained HeLa cell specimen of FIG. 7 as constructed by an SPLM system, according to embodiments of the invention.

FIG. 8(*a*) is an HR image of a specimen 150 having 500 nm microspheres (Polysciences) as constructed by an SPLM system 10, according to embodiments of the invention. The imaging process used to construct the HR image was identical the one used to construct the HR images in FIG. 7. For a single 500 nm microsphere, the bright center of the microsphere was clearly resolved as shown in FIG. 8(*a*), with the full-width at half maximum (FWHM) of 690 nm. FIG. 8(*b*) is an HR image of a magnified small feature of the stained HeLa cell specimen 150 of FIG. 7 as constructed by an SPLM system 10, according to embodiments of the invention.

Since microscopy resolution may be defined in some cases based on a given microscope's ability to resolve two closely spaced feature points, the case of two closely spaced microspheres can be analyzed to establish a resolution of an SPLM system 10 of embodiments. FIG. 8(*a*) shows the reconstructed images of two closely packed 500 nm microspheres with center-to-center distance of 660 nm. The data trace in FIG. 8(*a*) shows a valley between the two peaks and, thus, establishes that the resolution may be 660 nm or better in some embodiments. To further verify this point, FIG. 8(*b*) shows the magnified small feature of the stained HeLa cell specimen of FIG. 7 and the FWHM of this feature was estimated to be about 710 nm.

III. Concept

In embodiments such as the example shown in FIG. 1, the specimen 150 is placed on a specimen surface 140 located slightly above the active sensing area 164 of the sensing surface 162. The illuminating display 116 (e.g., a monochromatic or color LCD) of a scanning illumination device 110 (e.g., mobile communication device) is located at a distance, d, (e.g., about 5-10 mm) away from the sensing surface 162. A light element 117 (e.g., one or more light emitting elements (e.g., pixels)) of the illuminating display 117 provide illumination 118 (e.g., incoherent light). The illumination 118 generates a projection 170 (shadow) on the light detector 162. The light detector 160 can capture a LR projection image. This LR projection image is the best achievable given the size limitations (e.g., pixel size limitations) of the light detecting elements 166 (as shown in FIG. 2), but "low resolution" in that features sizes of the specimen 150 may be much smaller than the size (e.g., pixel size) of the light detecting element 166.

In embodiments, to improve the resolution, a sequence of sub-pixel shifted LR projection images is captured, for which light emitting elements (e.g., pixels) on the illuminating display 116 (e.g., an LCD) provide illumination 118. Each of these LR projection images is a sub-pixel shifted projection image of the specimen 150. The sequence of sub-pixel shifted LR projection images can be based on the scanning locations of the light element 117 during a scanning cycle. For a known sub-pixel displacement, these sub-pixel shifted LR projection images can be used to create a HR (e.g., sub-pixel resolution) 2D image using pixel super-resolution techniques. This HR image can further be deconvolved with the point spread function of the pixel and optical system to recover a focused image of the specimen. The SPLM system 10 has made possible precise scanning of the light element 117 in conjunction with pixel super-resolution image processing techniques.

Furthermore, this concept of imaging can be extended beyond two dimensions. Computed tomography using different incident angles of light to generate multiple projections can be used to create a three dimensional reconstruction of the object. An example of using tomography to generate a 3D image can be found in Miao, J. R. R. Qin, Tourovskaia, Anna, Meyer, Michael G., Neumann, Thomas, Nelson, Alan C., and Seibel, Eric J., "*Dual-modal three-dimensional imaging of single cells with isometric high resolution using an optical projection tomography microscope*," J. Biomed., Opt., Vol. 14, 064034 (Dec. 21, 2009), which is hereby incorporated by reference in its entirety for all purposes. In our scheme, the shifting light element 117 (e.g., sets of pixels) across the illuminating display 119 (e.g. LC) can provide different angles of incident light necessary for 3D imaging.

IV. Operating Principles

In one operation, the specimen 150 is placed slightly (e.g., in the range of several hundred nanometers to microns) above the sensing surface 162 (e.g., outer surface) of the light detector 160 (e.g., CMOS imaging sensor array). Individuals or small sets of light emitting elements 166 (e.g., pixels) on the illuminating display (e.g., an LCD) are illuminated in succession to illuminate the specimen 150 at distance (e.g. 5 mm-10 mm) away, allowing the light detector 160 to record one or more sequences of sub-pixel-shifted LR projection images, which are "pixilated." One or more sequences of sub-pixel shifted LR projection images can be processed using super resolution techniques to combine many LR projection images to create a smaller sequence of HR images. An example of a super resolution technique can be found in Richard, L. M., Shultz, R., Stevenson, Robert L., "*Subpixel motion estimation for superresolution image sequence enhancement*," Journal of Visual Communication and Image Representation (1998), which is hereby incorporated by reference in its entirety for all purposes.

Super resolution or super resolution techniques refer to a general name for the many promising new techniques for imaging processing that can involve creating a single HR image from a sequence of lower resolution images. Some super resolution techniques can be found in Park, Sung Cheol, Park, and Min Kyu, Kang, Moon Gi, "Super-resolution image reconstruction: a technical overview," IEEE Signal Processing Magazine, pp. 21-36 (May 2003) ("Park"), which is hereby incorporated by reference in its entirety for all purposes. The general principle involves taking a sequence of LR projection images in which the target is sampled at below the Nyquist rate, but for which subsequent frames involve a slight sub-pixel translational shift. This principle can be found in Russell, K. J. B., Hardie, C., Bognar, John G., Armstrong, and Ernest E., Watson, Edward A., "*High resolution image reconstruction from a sequence of rotated and translated frames and its application to an infrared imaging system*," Optical Engineering (1997), which is hereby incorporated by reference in its entirety for all purposes. If this translational shift is known, then a system of matrix equations can be established from the low resolution sequence to solve for sub-pixel values to create a single HR image. In general, the original HR image can theoretically be recovered even from a significantly decimated, blurred, translated, and rotated low resolution image sequence; resolution is limited only by the diffraction limit and noise, as described in Park.

Figure 9:
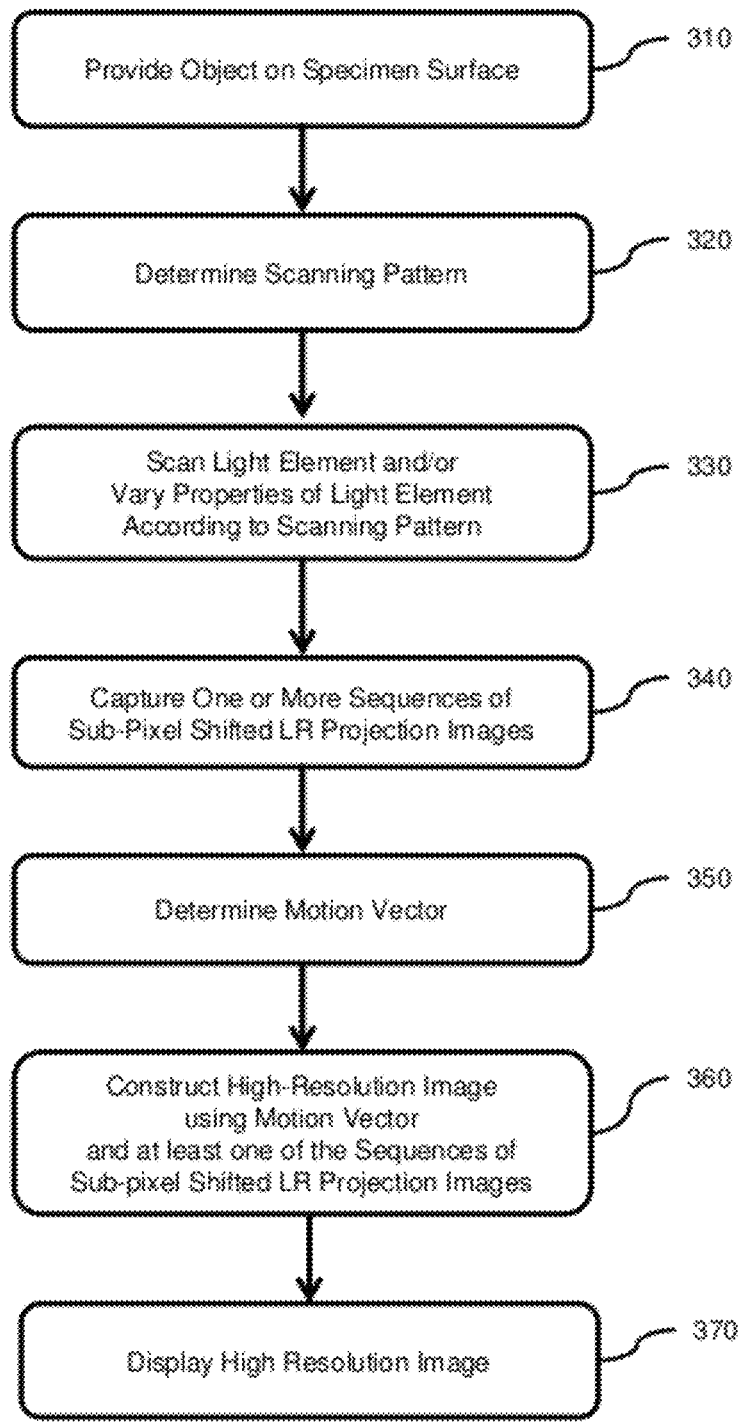
FIG. 9 is a flow chart of an exemplary operation of an SPLM device, according to embodiments of the invention.

FIG. 9 is a flow chart of an exemplary operation of an SPLM device 100, according to embodiments of the invention. The SPLM 100 includes a scanning illumination source 110 for shifting or otherwise scanning a light element 117 across an object 152 being imaged. The SPLM 100 also includes a specimen surface 140, a light detector 160 having a sensing surface 162, a thin transparent layer 165 between the sensing surface 162 and the specimen surface 140, and a processor (first processor 112 and/or second processor 210). The scanning illumination source 110 is located at a distance, d, from the sensing surface 162. This exemplary operation includes an imaging run having a single scanning cycle. Other embodiments may have an imaging run with multiple scanning cycles.

In step 310, the object 152 is placed onto the specimen surface 140 of the SPLM 100. The object 152 may be located proximal a sensing area 164 of the sensing surface 162 at the active layer of the light detector 160.

In step 320, the processor determines a scanning pattern. An example of a scanning pattern is shown in FIGS. 4(a) and 4(b). The scanning pattern may include scanning locations at different times during a scanning cycle and properties (e.g., wavelength(s) of light used, the size and shape of the light element, the intensity(ies) of the light element, etc.) of the light element 117 at different scanning locations, the amount of sub-pixel shift desired between subsequent LR projection images, the total number of LR projection images desired in the scan and/or in the sequence of LR projection images, the total number of HR images desired in an imaging run, and other suitable information related to the operation of the SPLM system 10. The processor may retrieve a predetermined scanning pattern from the CRM (first CRM 114 or second CRM 220) or the processor may determine a scanning pattern based on input from a user of the SPLM system 10. For example, the user may provide information such as properties of the light element, the amount of sub-pixel shift desired between subsequent LR projection images, the total number of HR images desired, and other suitable input.

The scanning locations in the scanning pattern can be determined to generate a sequence of sub-pixel shifted projections at the sensing surface 162. The shift of a projection 170 is proportional to the thickness of the transparent layer 165 and the tilt/shift extent (i.e. distance or illumination angle change between neighboring scanning locations). The amount of translation of the light element 117 between neighboring scanning positions that will result in sub-pixel shifting of the projections 170 can be determined based on the thickness of the transparent layer 165 and the required sub-pixel shift value. The scanning locations in the scanning pattern can be based on the amount of translation of the light element 117 between neighboring scanning positions.

In step 330, the scanning illumination source 110 scans the light element 117 and modifies the properties of the light element 117 according to the scanning pattern. In one embodiment, the scanning illumination source 110 (e.g., smartphone) has an illuminating display 116 in the form of a LCD. In this example, the scanning pattern includes a two-dimensional array of scanning positions and the scanning times associated with the scanning positions. During scanning the light element 117 may be a set of light emitting components (e.g. pixels) in the LCD which are sequentially illuminated to shift the light element 117 through each row of the two-dimensional array of scanning locations. The properties of the light element 117 may vary at different locations. For example, the size (number of light emitting components) of the light element 117 may vary to maintain approximately the same intensity level at a location at the sensing surface 162.

In one embodiment, the light element 117 can provide illumination 118 of n different wavelengths $\lambda_1, \ldots, \lambda_n$ at different times during a scanning cycle to obtain a sequence of projection images for each wavelength. Any suitable number of wavelengths may be used (e.g., n=1, 2, 3, 4, 5, ..., 20). In one embodiment, the light element 117 may provide illumination 118 of three wavelengths $\lambda_1, \lambda_2,$ and $\lambda_3$ corresponding to red, green, blue colors at different sampling times. In some cases, the illumination 118 from one scanning location to a neighboring scanning location may have different wavelengths. In other cases, the illumination 118 may have a first wavelength during a first series of scanning positions, and then provide illumination 118 of a second wavelength during a second series of scanning positions, and so forth until n sequences of projection images corresponding to n different wavelengths have been captured.

In step 340, the light detector 160 captures one or more sequences of sub-pixel shifted LR images of the object 152 as the light element 117 translates to different scanning positions. The light detector 160 captures an LR projection image for each scanning location. Any suitable number of images (e.g., 3, 5, 10, 50, 100, etc.) may be in each sequence. In one example, the scanning locations may be in the form of a two-dimensional array of scanning positions, where each row/column of scanning positions can generate a row of sub-pixel shifted projections 170. In this example, a sequence of sub-pixel LR images may be captured as the light element 117 shifts across each row/column in the two-dimensional array of scanning positions.

In step 350, the processor uses a suitable method to determine the motion vector of the projections 170 at the sensing surface 162. In some cases, the processor may also determine motion vectors of the projections 170 at other parallel planes through the object 152. Any suitable method of determining a motion vector can be used. In one example, the motion vector of the projections at the sensing surface 162 may be determined based on the distance between neighboring scanning positions and the thickness of the transparent layer 165. In another example, the motion vector of the projections at planes parallel to the sensing surface 162 may be determined based on the distance between neighboring scanning positions and the thickness of the transparent layer 165 and the distance between the plane and the sensing surface 162.

In step 360, the processor uses an appropriate SR algorithm to construct a HR image of the object 152 from data from a sequence of sub-pixel shifted LR projection images and corresponding motion vector(s). For example, the processor can construct a 2D image of the object 152 at a plane through the object 152 by using a motion vector at that plane. In one example, the processor can generate a 3D HR image by stacking the 2D HR images constructed based on motion vectors at different planes. If the light detector 160 is a monochromatic light detector, the HR image will be a monochromatic HR image (black and white HR image). If the light detector 122 is a color light detector (e.g., a color CMOS imaging sensor), the image resulting from this reconstruction is a color image.

In one embodiment, a shift-and-add SR algorithm may be used to construct an HR image with data from a sequence of sub-pixel shifted LR projection images. In this embodiment, an HR image grid is formed with an enhancement factor of n, where each n-by-n pixel area of the HR image grid corresponds to a 1-by-1 pixel area of the LR frame grid. Then, the HR image grid is filled with the corresponding pixel values from the sequence of sub-pixel shifted LR projection images. The mapping of the pixels within the n-by-n grid is determined from the known, estimated sub-pixel shift of each image from the motion vector determined. In other words, each LR projection image is shifted by the relative sub-pixel shift of the object 152 from its original position and then added together to form a HR image. Finally, deblurring using the wiener deconvolution method may be used to remove blurring and noise in the final HR image.

In one embodiment, the light element 117 can provide illumination 118 of n different wavelengths $\lambda_1, \ldots, \lambda_n$ at different times during a scanning cycle to obtain a sequence of projection images for each wavelength. In this embodiment, the processor can use an appropriate SR algorithm to reconstruct an HR image for each wavelength or color based on each sequence of sub-pixel shifted LR projection images and the motion vector. The SPLM device 100 can combine the HR images of different wavelengths or colors to obtain a computed color HR image. For example, an SPLM device 100 using RGB illumination from can be used to construct a computed color (RGB) HR image.

In step 370, the processor can display one or more HR images to a suitable image display 230 (e.g., two-dimensional display (color or monochromatic), three-dimensional display (color or monochromatic)). Any suitable image generated by the SPLM device 10 can be displayed. Some examples of suitable images include: LR projection images, 2D black and white HR images, 2D color HR images, 3D black and white HR images, and/or 3D color HR images.

V. A Super Resolution Model and Solution

Embodiments of the SPLM system 10 use a SR algorithm to reconstruct an HR image. One example of a SR algorithm is the general pixel super resolution model and solution described in this Section. This general pixel super resolution model and solution has a simple, fast and non-iterative method that preserves the estimation optimality in the Maximum-Likelihood sense. Some details of this super-resolution model and solution can be found in Hardie, Elad, M., and Hel-Or, Y., "*A fast super-resolution reconstruction algorithm for pure translational motion and common space-invariant blur*," IEEE Transactions on Image Processing, Vol. 10, pp. 1187-1193 (2001) ("Elad"), Farsiu, Sina, et al., "*Fast and robust multiframe super resolution,*" IEEE Trans Image Process, vol. 13, pp. 1327-1344 (2004), and Farsiu S, et al., "*Multiframe demosaicing and super-resolution of color images,*" IEEE Trans Image Process, vol. 15, pp. 141-159 (2006), which are hereby incorporated by reference in their entirety for all purposes.

In an scanning cycle, a sequence of N captured LR projection images, $Y_k$ (k=1, 2 . . . N) can be used to reconstruct an improved HR image, X. The images may be represented by lexicographically ordered column vectors. The LR projection image can be modeled by the following equation:

$$Y_k=DHF_kX+V_k(k=1, 2 \ldots N) \quad \text{(Eqn. 1)}$$

The matrix $F_k$ stands for the sub-pixel shift operation for the image X. The matrix H is the pixel transfer function of the light detector 160 (e.g., CMOS image sensor). The matrix D stands for the decimation operation, representing the reduction of the number of observed pixels in the measured images. $V_k$ represents Gaussian additive measurement noise with zeros mean and auto-correlation matrix: $W_k=E\{V_kV_k^T\}$.

The Maximum-Likelihood estimation of X can be described as the following expression:

$$\hat{X} = \text{ArgMin}\left\{\sum_{k=1}^{N}(Y_k - DHF_kX)^TW_k^{-1}(Y_k - DHF_kX)\right\} \quad \text{(Eqn. 2)}$$

And the closed-from solution for $\hat{X}$ is shown to be:

$$\hat{X}=H^{-1}R^{-1}P \quad \text{(Eqn. 3)}$$

where, $R=\Sigma_{k=1}^{N}F_k^TD^TDF_k$, $P=\Sigma_{k=1}^{N}F_k^TD^TY_k$

R can be a diagonal matrix and the computation complexity of this approach may be: $O(n*\log(n))$.

VI. Different Schemes

A. Scheme 1-2D Monochromatic SPLM Systems

In a first scheme, SPLM systems 10 of embodiments may be designed to generate 2D monochromatic HR images of a specimen 150 using a suitable SR algorithm based on a sequence of LR projection images and a motion vector. For this case, there is only the known translational shift and space invariant point spread function of the system, H, which is also known. Hence, more effective and computationally efficient super resolution techniques can be applied, such as the following as proposed in Elad. For an original HR image, X, of a specimen 150 that is the desired output of the SPLM system 10, a low resolution image sequence of the sample:

$$Y_k=DHF_kX+V_k(k=1, 2 \ldots N) \quad \text{(Eqn. 4)}$$

is obtained, where $F_k$ is the translational shift, H is the point spread function of the optical system, $D_k$ is the downsampling of the original LR projection image and $V_k$ is white noise with auto-correlation: $W_k=E\{V_kV_k^T\}$. Hence, by minimizing the least square error, the computed high resolution image $\hat{X}$ is obtained from a sequence of N LR projection images as follows:

$$\hat{X} = \text{Arg}_X\text{Min}\left\{\sum_{k=1}^{N}(Y_k - D_kHF_kX)^TW_k^{-1}(Y_k - D_kHF_kX)\right\} \quad \text{(Eqn. 5)}$$

This optimization can be done computationally with iterative methods described in Elad. The end result of this optimization can be an in-focus HR image or sequence of HR images of the specimen generated from the original LR projection images captured by the light detector 160. (e.g., CMOS image sensor).

In embodiments, an SPLM system 10 may include an illuminating display 116 in the form of a pixel array (e.g., rectangular pixel array). For example, the illuminating display 116 may be a rectangular pixel array of an LCD. In these embodiments, the sub-pixel shifts between subsequent LR projection images of a sequence may be related by a characteristic sub-pixel spacing, α, related to the illumination scanning sequence, the detector array pixel sizes, and the distances between the specimen 150 and source/detector. The distance between the specimen 150 and the illumination source 110 may be the distance, d, between the top of the transparent layer 140 and the display surface 119. The distance between the specimen 150 and the light detector 160 may be the thickness of the transparent layer 165.

For an SPLM system 10 having an illumination display 116 with a display surface 119 parallel to the sensing surface 162 of the light detector 160 and the specimen surface 140, the projection of a point on the plane of the specimen surface 140 onto the detection plane (i.e. plane of the sensing surface 162) will be shifted in increments related to sin θ. The angle, θ is the angle of a line from the light element 117 (e.g., the center of a set of illuminated pixels on an LCD) to the point of the specimen 150, with respect to the specimen surface plane normal vector. For small angles, the sub-pixel shifts can be approximated as equal and the solution for the motion vector of the LR sequence can be found by a simple one-dimensional optimization of, α. In cases where the illumination (LCD) plane and detector planes are parallel, the sub-pixel shifts should be 'exactly' equal.

B. Scheme 2-2D Color SPLM Systems

In a second scheme, an SPLM system 10 of embodiments may be designed to generate 2D color HR images of a specimen 150 using a suitable SR algorithm based on a sequence of LR color projection images captured by a color light detector 160. In this scheme, the SPLM system 10 includes a color light detector 112 (e.g., a color CMOS sensor) that can capture a sequence of sub-pixel shifted color LR projection images. The processor 210 can generate one or more SR color images using a suitable color super resolution technique with the sequence of sub-pixel shifted color LR projection images. The simplest technique involves using a monochromatic super resolution technique on each of the color components independently. In another example, a more complicated super resolution technique can be used that involves transforming to a different color space, such as the one found in Farsiu, Sina, et al., "*Advances and challenges in super-resolution,*" Wiley Periodicals (2004), which is hereby incorporated by reference in its entirety for all purposes.

C. Scheme 3-2D Computed Color SPLM Systems

In a third scheme, an SPLM system 10 of embodiments may be designed to generate 2D color HR images of a specimen 150 using a suitable SR algorithm based on multiple sequences of LR frames, each sequence associated with a different wavelength or color of illumination 118. The SPLM system 10 can construct a 2D color HR image based on each sequence associated with a different wavelength/color. The SPLM system 10 can combine the 2D color HR images associated with the different wavelengths to create a 2D multi-color HR image of the specimen 150. The SPLM system 10 of these embodiments includes a scanning illumination source 100 with a color illumination display 116 (e.g., color LCD) or another device that can generate color illumination 118. Any suitable wavelengths and number of wavelengths may be used. In one example, wavelengths of light may be chosen that cover the widest viewable color range. In some cases, separate scans using different wavelengths/colors can be used to capture separate RGB sequences of LR projection images. In other cases, the light element 117 may sequentially alternate between the different wavelengths/colors in a single scan.

In one embodiment, the SPLM system 10 may include a scanning illumination source 100 having a RGB illumination display 116 (e.g., a RGB LCD). In this embodiment, separate red, green, and blue (RBB) scans can be used to capture separate RGB sequences of LR projection images (i.e. red sequence, green sequence, and blue sequence). The SPLM system 10 of this embodiment can generate an HR RGB image based each sequence. The SPLM system 10 can combine the 2D color HR images based on each sequence to generate a RGB image.

D. Scheme 4-3D SPLM Systems with 3D display

In a fourth scheme, an SPLM system 10 of embodiments may be designed for 3D imaging on a 3D display 230. In this scheme, the SPLM system 10 can generate n 2D HR images at n different incidence angles to generate different views of the object 152 based on the different locations of the light element 117.

In this scheme, the scanning illumination source 110 scans the light element 117 to locations that generate illumination 118 from illumination angles in a range around each of the n different incidence angles of interest. For example, if a view of the object 152 from 30 is desired, the scanning illumination source 110 may scan the light element 117 to generate illumination 118 from illumination angles in the range of 30+/−2 degrees in X/Y. As another example, if a view of the object 152 from −30 degrees is desired, the scanning illumination source 110 may scan the light element 117 to generate illumination 118 from illumination angles in the range of −30+/−2 degrees in X/Y. The "angular" scan range for a single HR image may be constant and small (4 degrees in this example) relative to the large angle displacements used to get different views for 3D imaging. Each of the HR images is still obtained from reconstructing from a LR image sequence, captured by scanning the illumination, but at a much larger angle away.

The 2D HR images from different incidence angles can be combined and displayed on a 3D display 230 (e.g., 3D monitor), or as a rotating gif or video file. This can be achieved by using different regions of the illumination LCD to generate high resolution projection images of a sample, but from different angles.

In imaging schemes where a view at a plane parallel to the sensing surface may be desired, the scanning illumination source 110 may scan the light element 117 to locations that generate illumination 118 from illumination angles in a range around normal to the sensing surface. For example, the scanning illumination source 110 may scan the light element 117 to generate illumination 118 from illumination angles in the range of +/−2 degrees in X/Y.

D. Scheme 5-3D Focusing SPLM Systems

In a fifth scheme, an SPLM system 10 of embodiments may be designed to "focus" 2D HR images at different planes of interest through the specimen 150. The SPLM system 10 can also stack the "focused" 2D HR images at different planes to generate a 3D HR image. For a three-dimensional specimen, the SPLM system 10 can construct HR images from sequences of sub-pixel shifted LR images based on different motion vectors associated with different sub-pixel shifts in order to achieve "focusing" at different planes within the three-dimensional sample.

Under this scheme, the SPLM system 10 can construct each focused 2D image at a plane based on a captured sequence of sub-pixel shifted LR projection images and the determined motion vector at the plane. For example, the SPLM system 10 may create a 2D HD image of a slice of a specimen 150 at a plane. In this example, the SPLM system 10 determines the motion vector of the LR projection images at that plane. The SPLM system 10 constructs the focused 2D HD image based on the determined motion vector at the plane of interest and a sequence of sub-pixel shifted LR projection images captured by the light detector 160. The SPLM system 10 can also refocus at multiple planes by constructing HR images using multiple motion vectors and the same sequence of sub-pixel shifted LR projection images.

Since the quality of the focus of the reconstructed image depends on the correct estimation of the sub-pixel shifts of the LR projection images, and these sub-pixel shifts depend on the distance of the specimen 150 between the light detector 160 and the illumination planes, using different sub-pixel shifts (i.e. motion vectors) in the reconstruction step can allow for refocusing to specific specimen planes above the light detector 160. This effectively allows for a single, extensive scan sequence of LR projection images to not only provide three dimensional data with projection images from different angles (previous scheme), but also focusing to specific three dimensional planes.

Figure 10:
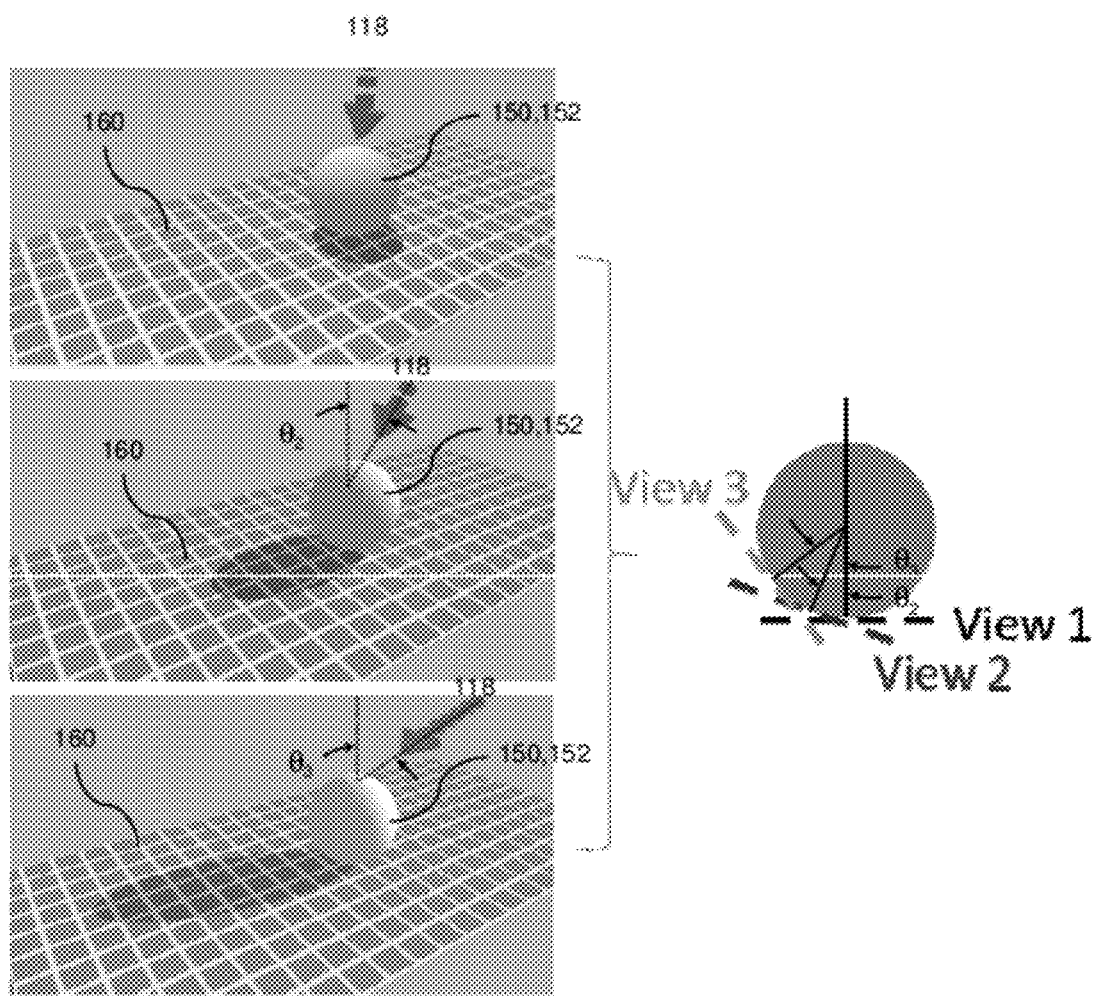
FIG. 10 is a schematic drawing of three projections on a light detector from three different illumination angles, $\theta_1$, $\theta_2$, and $\theta_3$, according to an embodiment of the invention.

In one embodiment, the scanning illumination device 110 sweep the light element 117 to generate illumination 118 between a wide range of illumination angles in order to generate an extensive scan sequence of LR projection images. FIG. 10 is a schematic drawing of three projections on a light detector 160 from three wide ranging incidence angles, $\theta_1$, $\theta_2$, and $\theta_3$, according to an embodiment of the invention. Changing the illumination angle of the light 118 from the light element 117 can generates a sequence of three projections associated with different views View 1, View 2, and View 3 of the object 152. In FIG. 10, $\theta_1=0$ degrees, and is in the direction of a negative z-axis. The light detector 160 can capture a sequence of LR projection images associated with the shifting projections. The light detector 160 can also capture multiple sequences of sub-pixels LR projection images associated with the illumination sweeping between the wide ranging incidence angles. This extensive scan sequence of LR projection images may be used to generate 3D data with projection images from the different views (previous scheme), but also to provide focusing to specific 3D planes.

VI. Subsystems

Figure 11:
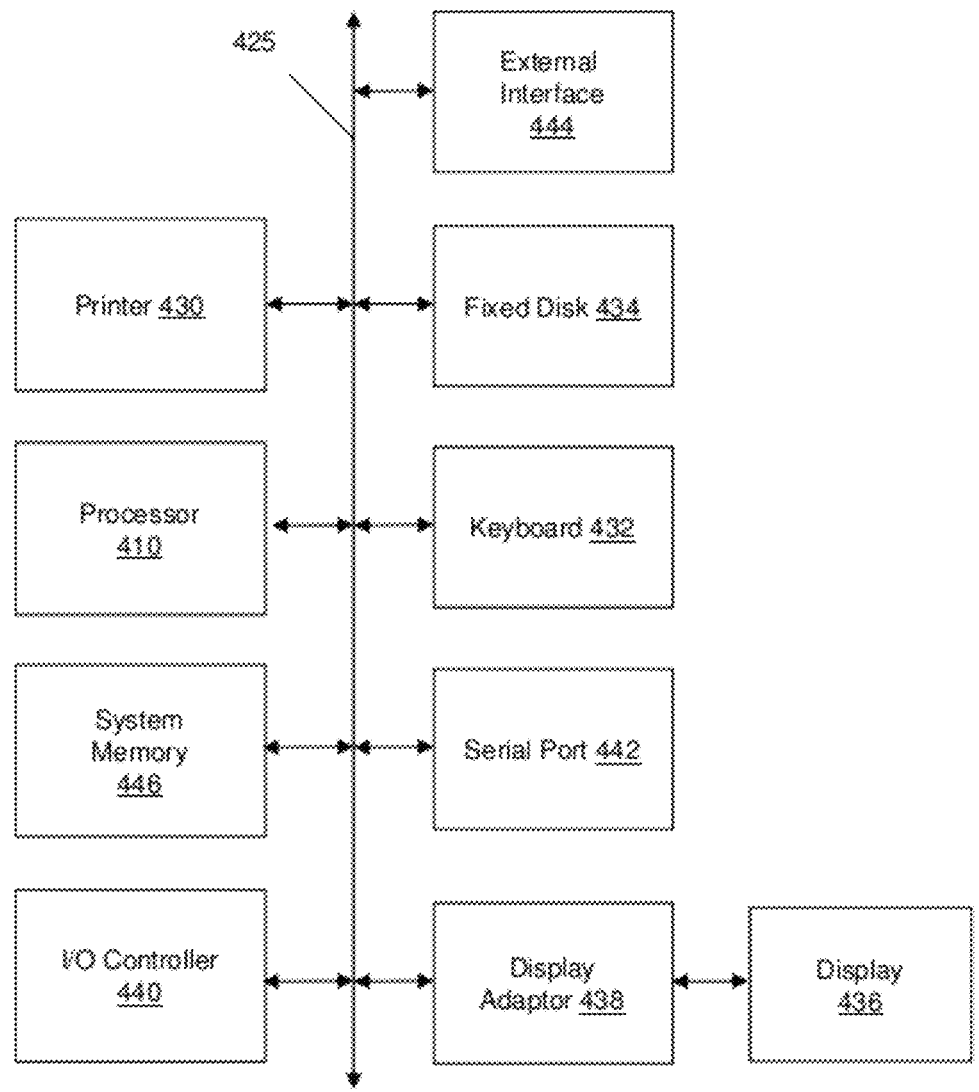
FIG. 11 is a block diagram of subsystems that may be present in the SPLM system, according to embodiments of the invention.

FIG. 11 is a block diagram of subsystems that may be present in the SPLM system 10, according to embodiments of the invention. For example, the SPLM system 10 includes a processor 410. The processor 410 may include first processor 112 and/or second processor 210. The processor 410 may be a component of the light detector 122 in some cases. The processor 410 may be a component of the scanning illumination source 100 in some cases.

The various components previously described in the Figures may operate using one or more of the subsystems to facilitate the functions described herein. Any of the components in the Figures may use any suitable number of subsystems to facilitate the functions described herein. Examples of such subsystems and/or components are shown in a FIG. 11. The subsystems shown in FIG. 11 are interconnected via a system bus 425. Additional subsystems such as a printer 430, keyboard 432, fixed disk 434 (or other memory comprising computer readable media), display 436, which is coupled to display adapter 438, and others are shown. The display 436 may include the illuminating display 116 and/or the image display 230. Peripherals and input/output (I/O) devices, which couple to I/O controller 440, can be connected to the computer system by any number of means known in the art, such as serial port 442. For example, serial port 442 or external interface 444 can be used to connect the computer apparatus to a wide area network such as the Internet, a mouse input device, or a scanner. The interconnection via system bus allows the processor 410 to communicate with each subsystem and to control the execution of instructions from system memory 446 or the fixed disk 434, as well as the exchange of information between subsystems. The system memory 446 and/or the fixed disk 434 may embody a first CRM 114 and/or a second CRM 220. Any of these elements may be present in the previously described features.

In some embodiments, an output device such as the printer 430 or display 436 of the SPLM system 10 can output various forms of data. For example, the SPLM system 10 can output 2D/3D HR color/monochromatic images, data associated with these images, or other data associated with analyses performed by the SPLM system 10.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a CRM, such as a random access memory (RAM), a read only memory (ROM), a magnetic medium such as a hard-drive or a floppy disk, or an optical medium such as a CD-ROM. Any such CRM may reside on or within a single computational apparatus, and may be present on or within different computational apparatuses within a system or network.

A recitation of "a", "an" or "the" is intended to mean "one or more" unless specifically indicated to the contrary.

The above description is illustrative and is not restrictive. Many variations of the disclosure will become apparent to those skilled in the art upon review of the disclosure. The scope of the disclosure should, therefore, be determined not with reference to the above description, but instead should be determined with reference to the pending claims along with their full scope or equivalents.

One or more features from any embodiment may be combined with one or more features of any other embodiment without departing from the scope of the disclosure. Further, modifications, additions, or omissions may be made to any embodiment without departing from the scope of the disclosure. The components of any embodiment may be integrated or separated according to particular needs without departing from the scope of the disclosure.

All patents, patent applications, publications, and descriptions mentioned above are hereby incorporated by reference in their entirety for all purposes. None is admitted to be prior art.

What is claimed is:

1. A scanning projective lensless microscope device, comprising:
   a specimen surface;
   an illumination source configured to provide illumination incident to a specimen located on the specimen surface, the illumination provided to the specimen from one side of the specimen surface, wherein the illumination is incident to the specimen at a plurality of illumination angles sequentially;
   a light detector configured to receive, from an opposite side of the specimen surface, illumination from the illumination source and passing through the specimen, wherein the light detector is further configured to sample a sequence of sub-pixel shifted projection images of the specimen while the specimen is being illuminated at the plurality of illumination angles sequentially, wherein each sub-pixel shifted projection image is sampled at a different sample time while the illumination source provides illumination at one of the illumination angles and each sub-pixel projection image is based on the illumination passing through the specimen; and a processor that constructs a high resolution image of the specimen using the sampled sequence of sub-pixel shifted projection images, wherein the scanning projective lensless microscope device does not have a lens in an illumination path between the illumination source and the specimen being imaged and does not have a lens in another illumination path between the specimen being imaged and the light detector.

2. The scanning projective lensless microscope device of claim 1, wherein the specimen surface is on a transparent layer, wherein the transparent layer is located between the specimen surface and a sensing surface of the light detector.

3. The scanning projective lensless microscope device of claim 2, wherein the transparent layer is a passivation layer disposed on the sensing surface of the light detector.

4. The scanning projective lensless microscope device of claim 1, wherein the illumination provided by the illumination source is incoherent light.

5. The scanning projective lensless microscope device of claim 1, wherein adjacent sub-pixel shifted projection images in the sequence are within a sensor pixel size from each other.

6. The scanning projective lensless microscope device of claim 1, wherein intensity of the illumination from the illumination source varies at different illumination angles.

7. The scanning projective lensless microscope device of claim 1, wherein the specimen being imaged is a confluent specimen.

8. The scanning projective lensless microscope device of claim 1, wherein the light detector is a color imaging sensor, and wherein the high resolution image is a color image.

9. scanning projective lensless microscope device of claim 1, wherein the illumination source is further configured to provide illumination at the plurality of illumination angles for each wavelength of a plurality of wavelengths, wherein the light detector is further configured to sample sequences of sub-pixel projection images, each sequence associated with one of the wavelengths, wherein the processor is further configured to generate high resolution images, each high resolution image constructed from one of the sampled sequences of sub-pixel projection images, wherein the processor is further configured to combine the high resolution images to generate a color high resolution image.

10. The scanning projective lensless microscope device of claim 1, wherein the processor is further configured to determine a motion vector of the plurality of sub-pixel shifted projections at a plane of interest, and wherein the processor constructs the high resolution image of the specimen at the plane of interested from the sampled sequence of sub-pixel shifted projection images and also from the determined motion vector.

11. The scanning projective lensless microscope device of claim 1, wherein the processor constructs the high resolution image of the specimen also from a motion vector determined at a focusing plane through the specimen, wherein the high resolution image is focused at the focusing plane.

12. The scanning projective lensless microscope device of claim 1, wherein the illumination source comprises an illuminating display, wherein illumination incident to the specimen at the plurality of illumination angles sequentially is provided by sequentially illuminating different sets of one or more pixels in the illumination display.

13. The scanning projective lensless microscope device of claim 12, wherein the illuminating display is in the form of an LCD or an LED display.

14. The scanning projective lensless microscope device of claim 1, wherein the illumination source has a light element providing the illumination, wherein the light element is shifted to a plurality of locations to provide illumination incident to the specimen at the plurality of illumination angles sequentially.

15. The scanning projective lensless microscope device of claim 14, wherein the light element at each of the locations is one or more illuminated pixels of an illuminating display.

16. The scanning projective lensless microscope device of claim 15, wherein the illuminating display is in the form of an LCD or an LED display.

17. The scanning projective lensless microscope device of claim 14, wherein shifting of the light element to the plurality of locations causes a projection of the specimen to shift by sub-pixel shifts across the light detector.

18. The scanning projective lensless microscope device of claim 17, wherein each sub-pixel shift is a distance of less than a size of one pixel of the light detector.

19. The scanning projective lensless microscope device of claim 14, wherein intensity of the illumination from the light element varies at different locations.

20. The scanning projective lensless microscope device of claim 14, wherein variation in the intensity at each location is based on a distance between each location and a center of the plurality of locations.

21. The scanning projective lensless microscope system of claim 1, further comprising a display in electronic communication with the processor, the display configured to display one or more high resolution images constructed by the processor.

22. A method of generating a high resolution image of a specimen using a scanning projective lensless microscope device comprising a specimen surface, an illuminating display, a light detector, and a processor, the method comprising:

receiving a specimen on the specimen surface;

sequentially illuminating different sets of one or more pixels of the illuminating display to provide illumination incident to the specimen at a plurality of illumination angles at different sample times, wherein the illumination is provided to the specimen from one side of the specimen surface;

receiving, at a light detector, illumination passing through the specimen from the illumination display, wherein the scanning projective lensless microscope device does not have a lens in an illumination path between the illuminating display and the specimen being imaged and does not have a lens in another illumination path between the specimen being imaged and the light detector;

sampling a sequence of sub-pixel shifted projection images while the specimen is illuminated at the plurality of illumination angles sequentially, wherein each sub-pixel shifted projection image is sampled at a different sample time while the illuminating display provides illumination at one of the illumination angles and each sub-pixel shifted projection image is based on illumination passing through the specimen; and constructing a high resolution image of the specimen using the sampled sequence of sub-pixel shifted projection images.

23. The method of claim 22, wherein the processor constructs the high resolution image also using a motion vector.

24. The method of claim 23, further comprising determining the motion vector of the sub-pixel shifted projection images at a focusing plane, wherein the constructed high resolution image is focused at the focusing plane.

* * * * *